(12) United States Patent
Tyree

(10) Patent No.: US 12,221,397 B2
(45) Date of Patent: *Feb. 11, 2025

(54) FOLIAR FEEDING FORMULATION AND METHODS OF USE

(71) Applicant: Lucas Tyree, Lexington, VA (US)

(72) Inventor: Lucas Tyree, Lexington, VA (US)

(73) Assignee: LUCAS TYREE, Lexington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/755,422

(22) PCT Filed: Aug. 30, 2016

(86) PCT No.: PCT/US2016/049416
§ 371 (c)(1),
(2) Date: Feb. 26, 2018

(87) PCT Pub. No.: WO2017/040485
PCT Pub. Date: Mar. 9, 2017

(65) Prior Publication Data
US 2019/0127286 A1 May 2, 2019

Related U.S. Application Data

(60) Provisional application No. 62/339,329, filed on May 20, 2016, provisional application No. 62/212,358, filed on Aug. 31, 2015.

(51) Int. Cl.
| | |
|---|---|
| C05F 11/00 | (2006.01) |
| A01G 7/00 | (2006.01) |
| A01G 22/15 | (2018.01) |
| A01G 31/00 | (2018.01) |
| A01G 31/02 | (2006.01) |
| C05B 7/00 | (2006.01) |
| C05D 9/02 | (2006.01) |
| C05F 11/10 | (2006.01) |
| C05G 3/50 | (2020.01) |
| C05G 3/70 | (2020.01) |
| C05G 5/23 | (2020.01) |
| A01G 24/15 | (2018.01) |
| A01G 24/18 | (2018.01) |
| A01G 24/23 | (2018.01) |
| A01G 24/25 | (2018.01) |
| A01G 24/28 | (2018.01) |
| A01G 24/42 | (2018.01) |
| A01G 24/44 | (2018.01) |
| A01G 24/48 | (2018.01) |

(52) U.S. Cl.
CPC .......... *C05B 7/00* (2013.01); *A01G 7/00* (2013.01); *A01G 22/15* (2018.02); *A01G 31/00* (2013.01); *A01G 31/02* (2013.01); *C05D 9/02* (2013.01); *C05F 11/10* (2013.01); *C05G 3/50* (2020.02); *C05G 3/70* (2020.02); *C05G 5/23* (2020.02); *A01G 24/15* (2018.02); *A01G 24/18* (2018.02); *A01G 24/23* (2018.02); *A01G 24/25* (2018.02); *A01G 24/28* (2018.02); *A01G 24/42* (2018.02); *A01G 24/44* (2018.02); *A01G 24/48* (2018.02); *Y02P 60/21* (2015.11)

(58) Field of Classification Search
CPC ........................................................ A01G 22/15
See application file for complete search history.

(56) References Cited

U.S. PATENT DOCUMENTS

| | | | |
|---|---|---|---|
| 2,270,518 A | 1/1942 | Bertram et al. | |
| 2,481,100 A | 9/1949 | Fox et al. | |
| 3,373,009 A | 3/1968 | Pruitt et al. | |
| 3,655,357 A | 4/1972 | Ray | |
| 3,657,443 A | 4/1972 | Klopping | |
| 3,753,675 A | 8/1973 | Young | |
| 3,756,801 A | 9/1973 | Herschler | |
| 3,854,923 A | 12/1974 | Ott | |
| 3,900,572 A | 8/1975 | Peer | |
| 3,918,952 A | 11/1975 | Neumiller | |
| 4,075,785 A | 2/1978 | Jones | |
| 4,133,141 A * | 1/1979 | Lee | A01G 9/02 47/79 |
| 4,210,437 A | 7/1980 | Windgassen et al. | |
| 4,279,101 A | 7/1981 | Leroux | |
| 4,399,634 A | 8/1983 | O'Hare | |
| 4,468,885 A | 9/1984 | Mandish | |

(Continued)

FOREIGN PATENT DOCUMENTS

| | | |
|---|---|---|
| EP | 0013307 A1 | 7/1980 |
| EP | 0114960 A2 | 8/1984 |

(Continued)

OTHER PUBLICATIONS

Singh et al. Precision Farming : A New Approach—"An Introduction of Plant Nutrients and Foliar Fertilization: A Review," 2013, pp. 258-320.*

(Continued)

*Primary Examiner* — Susan McCormick Ewoldt

(74) *Attorney, Agent, or Firm* — Sterne, Kessler, Goldstein & Fox P.L.L.C.

(57) ABSTRACT

Described is a hydroponic system wherein a feed formulation comprising a plant's nutritionally required mineral nutrients is applied to the foliage of the plant and the roots of the plant are in contact with an incomplete water solution that may comprise only hydrogen and oxygen. The feed formulation, methods of feeding a plant or plant seed, and plants produced thereby are also described.

16 Claims, 10 Drawing Sheets

(56) References Cited

U.S. PATENT DOCUMENTS

| | | | |
|---|---|---|---|
| 4,607,454 A | 8/1986 | Koike | |
| 4,699,644 A | 10/1987 | Brandt et al. | |
| 4,749,402 A | 6/1988 | Garrett et al. | |
| 4,756,120 A | 7/1988 | Arledge | |
| 4,863,506 A | 9/1989 | Young | |
| 4,965,962 A | 10/1990 | Akagi | |
| 5,067,275 A | 11/1991 | Constance | |
| 5,073,401 A | 12/1991 | Mohr | |
| 5,394,647 A | 3/1995 | Blackford, Jr. | |
| 5,424,072 A | 6/1995 | Narayanan | |
| 5,557,884 A | 9/1996 | Deppe | |
| 5,598,104 A | 1/1997 | Boyette, Jr. | |
| 5,634,959 A | 6/1997 | Beaty | |
| 5,780,390 A | 7/1998 | Hintz et al. | |
| 5,797,976 A | 8/1998 | Yamashita | |
| 6,241,795 B1 | 6/2001 | Svec et al. | |
| 6,309,440 B1 | 10/2001 | Yamashita | |
| 6,328,780 B1 | 12/2001 | Bull et al. | |
| 6,455,466 B1* | 9/2002 | Reid | A01N 3/00 |
| | | | 504/115 |
| 6,874,277 B2 | 4/2005 | Yamashita | |
| 7,098,170 B2 | 8/2006 | Asrar et al. | |
| 8,017,566 B2 | 9/2011 | Shiloach et al. | |
| 8,091,275 B2 | 1/2012 | Bissonnette et al. | |
| 8,404,936 B2 | 3/2013 | Skrsyniarz | |
| 8,466,087 B2 | 6/2013 | Goodwin | |
| 8,621,781 B2 | 1/2014 | Singh | |
| 8,669,421 B2 | 3/2014 | Gibson | |
| 8,677,685 B2 | 3/2014 | Kao | |
| 8,729,342 B2 | 5/2014 | Stark et al. | |
| 8,919,038 B2 | 12/2014 | Jensen | |
| 9,078,401 B2 | 7/2015 | Carroll et al. | |
| 2002/0143060 A1* | 10/2002 | Kohchi | A61K 31/17 |
| | | | 514/563 |
| 2003/0022372 A1 | 1/2003 | Aitken-Christie et al. | |
| 2003/0125212 A1 | 7/2003 | Yamaguchi et al. | |
| 2005/0245397 A1 | 11/2005 | Wood et al. | |
| 2006/0019830 A1 | 1/2006 | Xu et al. | |
| 2006/0168881 A1 | 8/2006 | Straumietis | |
| 2006/0194698 A1 | 8/2006 | Gwinn et al. | |
| 2011/0067301 A1 | 3/2011 | DeMitchell et al. | |
| 2011/0077155 A1* | 3/2011 | Goodwin | C05C 9/005 |
| | | | 504/101 |
| 2011/0098177 A1 | 4/2011 | Abou-Nemeh | |
| 2012/0185976 A1 | 7/2012 | Ryan et al. | |
| 2012/0312059 A1 | 12/2012 | Killick et al. | |
| 2013/0130896 A1 | 5/2013 | Dimenstein | |
| 2013/0172185 A1 | 7/2013 | Wei | |
| 2013/0219979 A1 | 8/2013 | Deb | |
| 2014/0069008 A1* | 3/2014 | Herrera-Estrella | C12N 9/0004 |
| | | | 47/59 R |
| 2014/0075841 A1 | 3/2014 | Degraff | |
| 2014/0113814 A1 | 4/2014 | Chambers | |
| 2014/0234503 A1 | 8/2014 | Dodd | |
| 2014/0289883 A1 | 9/2014 | Zee | |
| 2014/0366441 A1 | 12/2014 | Xu et al. | |
| 2015/0007498 A1 | 1/2015 | Hensley | |
| 2015/0113875 A1 | 4/2015 | Liotta | |
| 2021/0238108 A1 | 8/2021 | Tyree | |

FOREIGN PATENT DOCUMENTS

| | | |
|---|---|---|
| GB | 2314557 A | 1/1998 |
| WO | WO 99/22889 | 5/1999 |
| WO | WO 2005/112607 A1 | 1/2005 |
| WO | WO 2005/087691 A1 | 9/2005 |
| WO | WO 2009/134791 A2 | 5/2009 |
| WO | WO 2011/103617 | 1/2011 |
| WO | WO 2013/130451 A1 | 9/2013 |
| WO | WO 2014/007793 A1 | 1/2014 |
| WO | WO 2014/122669 A1 | 8/2014 |

OTHER PUBLICATIONS

Fagaria et al. "Foliar Fertilization of Crop Plants," Journal of Plant Nutrition, 32: 1044-1064, 2009.*
Uchida, R. "Essential Nutrients for Plant Growth: Nutrient Functions and Deficiency Symptoms," Plant Nutrient Management in Hawaii's Soils, Approaches for Tropical and Subtropical Agriculture, University of Hawaii at Manoa, 2000, Chapter 3, pp. 31-55.*
Pillay et al., "Elemental uptake by edivble herbs and lettuce (*Latuca sativa*)," Journal of Environmental Science and Health Part B ( 2007) 42, 423-428.*
Inoue et al., "Production of iron enriched vegetables: Effect of feeding time on the rate of increase in foliar iron content and foliar injury," Journal of Horticultural Science and Biotechnology (2000) 75 (2) 209-213.*
Anwar et al., "Uptake and distribution of minerals and heavy metals in commonly grown leafy vegetables species irrigated with sewage water," Environ Monit Assess (2016) 188:1-9.*
Karthika et al. "Biological Functions, Uptake and Transport of Essential Nutrients in Relation to Plant Growth," Plant Nutrients and Abiotic Stress Tolerance Book, Chapter 1, 2018, pp. 1-50.*
Noreen et al. "Foliar Application of Micronutrients in Mitigating Abiotic Stress in Crop Plants," Plant Nutrients and Abiotic Stress Tolerance Book, Chapter 3, 2018, pp. 95-118.*
Kaya et al. "Response of tomato (Lycopersicon esculentum L.) cultivars to foliar application of zinc when grown in sand culture at low zinc" Scientia Horticulturae, vol. 93, Issue 1, Feb. 28, 2002, pp. 53-64.*
Ludwig, R. "Arabidopsis Chloroplasts Dissimilate L-Arginine and L-Citrulline for Use as N Source," Plant Physiol. (1993) 101:429-434.*
Jordan, T. "Adjuvant Use With Herbicides: Factors to Consider," WS-7, Purdue University Cooperative Extension Service, Reviewed May 2001; https://www.extension.purdue.edu/extmedia/ws/ws-7. html; (Retrieved from the Internet on Jul. 27, 2023) (4 pages total).*
Blanchar, R.W., "Measurements of Sulfur in Soils and Plants," American Society of Agronomy-Crop Science Society of America-Soil Science of America, Agronomy Monograph No. 27, publ. 1986, pp. 455-490.*
Behrend, J., et al., "Nitrogen Metabolism in Planet Cell Suspension Cultures," *Plant Physiology* 56:584-589, American Society of Plant Biologist, United States (1975).
Dybing. C.D., et al., "Foliar Penetration By Chemicals," *Plant Physiology* 36:169-174, American Society of Plant Biologist, United States (1961).
Emmanouil, V., et al., "Induction of Resistance to *Verticillium dahliae* and Synthesis of Antifungal Compounds in Tomato, Pepper and Eggplant by Injecting Leaves with Various Substances," *Journal of Phytopathology* 100:212-225, American Phytopathology Society, United States (1981).
Fageria, N.K., et al., "Foliar Fertilization of Crop Plants," *Journal of Plant Nutrition* 32:1044-1064, Taylor and Francis Group, United States (2009).
Fernández, V., et al., "Uptake of Hydrophilic Solutes Through Plant Leaves: Current State of Knowledge and Perspectives of Foliar Fertilization," *Critical Reviews in Plant Sciences* 28:36-68, Elsevier, Netherlands (2009).
Fernández, V., et al., "From plant surface to plant metabolism: the uncertain fate of foliar-applied nutrients," *Frontiers in Planet Science* 4(289):1-5, Frontiers, Switzerland (2013).
Fernández, V., et al., "Foliar Iron Fertilization- A Critical Review," *Journal of Plant Nutrition* 28:2113-2124, Taylor and Francis Group, United States (2005).
"Foliar Nutrition," Curley, S., ed., Midwest Laboratories, United States (1994).
"General Hydroponics," Flora Products Usage Sheet, www.1000bulbs. com, accessed at https://www.1000bulbs.com/pdf/gh-gh1636-feed. pdf, accessed on Sep. 6, 2016, 2 pages.
"General Hydroponics FloraNova Jul. 4, 2010," Product Label, www.1000bulbs.com, accessed at https://www.1000bulbs.com/pdf/gh-gh1623-label.pdf, accessed on Sep. 6, 2016, 1 page.
Green, J., et al., "Preliminary Results on the Effectiveness of Two Organosilicone Adjuvants Plus Iron to Correct Leaf Iron Chlorosis

(56) References Cited

OTHER PUBLICATIONS of Containerized Carambola (Averrhoa Carambola) Trees," *Florida State Horticultural Society 112*:176-177, Rarebooksclub.com (1999).
Gupta, P.C., et al., "Interaction of myo-inositol, seed phosphorus, oil and yield in groundnut genotypes," *Journal of Crop and Weed 7*:214-216, Nadia, India (2011).
Kaiser, H., "Stomatal uptake of mineral particles from a sprayed suspension containing an organosilicone surfactant," *Journal of Plant Nutrition Soil Science 177*:869-874, Wiley-CH Verlag, GmbH & Co., Germany (2014).
Kasting, R., et al., "Ornithine, Citrulline and Arginine Metabolism in Watermelon Seedlings," *Plant Physiology 33*:350-354, American Society of Plant Biologist, United States (1958).
Li, Y-T., et al., "Advances in Study on Mechanism of Foliar Nutrition and Development of Foliar Fertilizer Application," *Science Agricultura Sinica 42*:162-172, Editorial Department of Scientia Agriculatura Sinica, China (2009).
Ludwig, R.A, "Arabidopsis Chloroplasts Dissimilate L-Arginine and L-Citrulline for Use as N Source," *Plant Physiology 101*:429-434, American Society of Plant Biologist, United States (1993).
Malakouti, M.J., "The effect of Micronutrients in ensuring Efficient Use of Macronutrients," *Turkish Journal of Agricultural and Forestry 32*:215-220, The Scientific and Technological Research Council of Turkey, Turkey (2008).
McCauley, "Plant Nutrient Functions and Deficiency and Toxicity Symptoms," landresources.montana.edu, accessed http://landresources.montana.edu/nm/documents/NM9.pdf, accessed on Sep. 7, 2016, 16 pages.
McGinnis, "Plant Tissue Analysis Guide," http://www.nurserycropscience.info. accessed http://www.nurserycropscience.info/nutrition/equipment-to-monitor-fertility/foliage/ncdacs-plant-tissue-analysis-guide.pdf/at_download/file, accessed on Sep. 7, 2016, 27 pages.
Mengel, K., "Alternative or Complementary Role of Foliar Supply in Mineral Nutrition," *Proceedings of the International Symposium on Foliar Nutrition of Perennial Fruit Plants*:33-47, ISHS, Belgium (2002).
Merigout, P., et al., "Physiological and Transcriptomic aspects of Urea Uptake and Assimilation in Arabidopsis Plants," *Plant Physiology 147*: 1225-1238, American Society of Plant Biologists, United States (2008).
Mishra, M., et al., "Basic and Potential Applications of Surfactants—A Review." *International Journal of Pharmtech Research 1*:1354-1365, Sphinx Publishing, Turkey (2009).
Mondal, F., et al., "Recovery from autotoxcity in strawberry by supplementation of amino acids." *Scientia Horitculturae 164*:137-144, Elsevier, Netherlands (2013).
Morgan, "Hydroponic Foliar Fertilization," Simplyhydro.com, accessed at http://www.simplyhydro.com/foliar_feeding.htm, accessed on Aug. 11, 2015, 3 pages.
Muñoz-Huerta, R.F., et al., "A Review of Methods for Sensing the Nitrogen Status in Plants: Advantages, Disadvantages and Recent Advances," *Sensors 13*:10823-10843, MDPI, Switzerland (2013).
Novozymes, "Bioyield Enhancers," www.bioag.novozymes.com, accessed at http://www.bioag.novozymes.com/en/products/asia/documents/asia_bioyield_enhancer_fact_sheet.pdf, accessed on Sep. 7, 2016, 2 pages.
Optic Foliar Overgrow, purchase information for "Optic Foliar Overgrow" as of at least Mar. 15, 2015, www.growershouse.com, accessed at http://growershouse.com/review/product/list/id/7837/, accessed on Sep. 7, 2016, 5 pages.
Park, H., "How to Cultivate Indigenous Microorganisms," www.ctahr.hawaii.edu/oc/freepubs, accessed at http://hkpi.webs.com/FarmingIndigenousMicroorganisms.pdf, accessed on Sep. 7, 2016, 6 pages.
Riederer, M., et al., "Effects of Surfactants on Water Permeability of Isolated plant Cuticles and on the Composition of their Cuticular Waxes," *Pesticide Science 29*: 85-94, John Wiley and Sons., United States (1990).
Rivera-Ortíz, P., et al., "Clorosis Ferrica En Citricos Y Fertilizacion Foliar," *Terra Latinoamericana 27*:11-16, Sociedad Mexicana de la Ciencia del Suelo, Mexico (2009).
Roosta, H.R., et al., "Effects of foliar application of some macro- and micro-nutrients on tomato plants in aquaponic and hydroponic systems," *Scientia Horticulturae 129*: 396-402, Elsevier B.V., Netherlands (2011).
Saad, A.I.M., et al., "Plant Tissue Culture Media," in *Recent Advances in Plant in vitro Culture*, Leva, A., ed., pp. 29-40, inTechOpen, Croatia (2012).
Sands, R., et al. "Uptake of Picloram by Eucalypt Leaf Discs," *New Phytologist 72*:87-99, Blackwell Publishing, United States (1973).
Schonherr, J., et al., "Penetration of Stomata by Liquids; Dependence on surface tension, wettability, and stomatal morphology," *Plant Physiology 49*:813-819, American Society of Plant Biologist, United States (1972).
Singh, Z., et al., "Surfactant and Nutrient Uptake in Citrus," in *Advances in Citrus Nutrition*, Srivastava, A.K., ed., pp. 157-167, Spring Science+ Business Media B.V., Netherlands (2012).
Stevens, P.J.G., "Formulation of Sprays to Improve the Efficacy of Foliar Fertilisers," *New Zealand Journal of Forestry Science 24*:27-34, Springer Publishing, New Zealand (1993).
Tezotto, T., et al., "Simple Procedure for nutrient analysis of coffee plant with energy dispersive X-ray fluorescence spectrometry (EDXRF)," *Scientia Agricola 70*:263-267, University of São Paulo, Brazil (2013).
Uathitirat, "Effects of Urea as a Nitrogen Source on Growth of Lettuce Grown in Hydroponic, " www.gra.cmu.act.th/igrc2013, accessed at http://www.grad.cmu.ac.th/igrc2013/proceedings/cfile/T8%20JUNYA%20(p. 37-39). pdf, accessed on Sep. 7, 2016, 3 pages.
United Nations, "Unece Standard FFV-58 concerning the marking and commercial quality control of leafy vegetables," www.unece.org, accessed at https://www.unece.org/fileadmin/DAM/trade/agr/standard/fresh/FFV-Std/English/58Leafy_vegetables 2012.pdf, accessed on Sep. 7, 2016, 7 pages.
University of Hawaii, "Nutrient Management," http://www.ctahr.hawaii.edu, accessed at http://www.ctahr.hawaii.edu/MauiSoil/c_goal.aspx, accessed on Sep. 7, 2016, 86 pages.
Wet Betty, "Wet Betty," product description as of at least Sep. 27, 2014, advancednutrients.com, accessed at http://www.advancednutrients.com/products/wet-betty/, accessed on Sep. 7, 2016, 7 pages.
Wojcik, P., "Uptake of Mineral Nutrients from Foliar Fertilization," *Journal of Fruit and Ornamental Plant Research 12*: 200-218, De Gruyter Open, Poland (2004).
International Search Report and Written Opinion for International Application No. PCT/US2016/049416, ISA, United States, mailed on Dec. 28, 2016, 11 pages.
International Preliminary Report on Patentability for International Application No. PCT/US2016/049416, International Bureau of WIPO, Switzerland, mailed on Mar. 6, 2018, 8 pages.
Asao, T., "Hydroponics—A Standard Methodology for Plant Biological Researches," Intech, Croatia (2012), 254 pages.
Christie, E., "Water and Nutrient Reuse within Closed Hydroponic Systems," *Electronic Theses & Dissertations*, Jack N. Averitt College of Graduate Studies, United States (2014), 102 pages.
Forwood, J.R., et al., "Effect of Dimethyl Sulfoxide on Forage Digestibility," *Agronomy Journal 76*: 996-999, American Society of Agronomy, United States (Nov.-Dec. 1984), 4 pages.
"Grandma Enggys F-1 Fulvic Acid," product description as of at least Sep. 27, 2014, www.Advancednutrients.com, accessed at http://www.advancednutrients.com/products/grandma-enggys-f1, accessed on Sep. 6, 2016, 9 pages.
Hosier, S., et al., "Guide to Symptoms of Plant Nutrient Deficiencies," http://ag.arizona.edu/maricopa/garden/, accessed at bttp://extension.arizona.edu/sites/extension.arizona.edu/files/pubs/az1106.pdf, accessed on Sep. 6, 2016, 3 pages.
Baker L., et al., "Environmental and Other Factors in the Response of Plants to Herbicides," in *Oregon State University Bulletin*, Freed, V.H., ed., Oregon State, United States (1968), 131 pages.
Markaryan, S.A., et al., "Effect of Dimethylsulphoxide on the Productivity of Henna and Indigo at soilless cultivation," *Physiol-*

*(56)* References Cited

OTHER PUBLICATIONS

*ogy and Biochemistry of Cultivated Plants* 24(2):171-177, Ukraine, Naukova Dumka (1992), 6 pages.
Munson, R., "Principles of Plant Analysis," in *Reference Methods for Plant Analysis*, Kalra, Y.P., ed., pp. 1-24, Taylor & Francis Group, United States (1998).

\* cited by examiner

FOLIAR FEEDING FORMULATION AND METHODS OF USE

FIELD OF THE INVENTION

The field of the invention generally relates to hydroponic plant growth using a simplified hydroponic system having reduced infrastructure, monitoring and maintenance requirements, and that utilizes a foliar feed formulation to supply all essential mineral nutrients to the plant.

BACKGROUND OF THE INVENTION

Hydroponics may be defined as the growing of plants in a mineral nutrient solution without soil (soilless growth) (Howard M. Resh, HYDROPONIC FOOD PRODUCTION 2 (6th ed. 2001) (hereinafter Resh); Toshiki Asao, HYDROPONICS-A STANDARD METHODOLOGY FOR PLANT BIOLOGICAL RESEARCHES, preface (2012) (hereinafter Asao)). In a hydroponic system, plant roots may be submerged in a mineral nutrient solution only (water culture methods) or in an inert medium such as sand, gravel, or other substrates to which a mineral nutrient solution is added (see, e.g., Resh at 2; Asao at preface). Hydroponic mineral nutrient solutions contain the essential elements (other than carbon, hydrogen, and oxygen) needed by a plant, and in amounts sufficient, for the planes normal growth and development (Resh at 2; Asao at preface and pages 1-2). Carbon, hydrogen, and oxygen are primarily supplied to the plant by the atmosphere and water (Asao at 2). Most hydroponic systems are enclosed in greenhouse-type structures to control growth temperature, protect against plant diseases and pests, and to protect against damaging wind and rain (Christie Emerson, WATER AND NUTRIENT REUSE WITHIN CLOSED HYDROPONIC SYSTEMS, Georgia Southern University Electronic Thesis & Dissertations Paper No. 1096 at 10-11 (2014) (hereinafter Christie)).

Because of its soil independence and careful control of growth conditions, a hydroponic system permits the growth of a plant year-round and in regions or climates where growth of such a plant would not otherwise be possible (e.g., urban, nutrient-depleted, or arid environments) (Christie at 10-11). As compared to soil-based growth, hydroponic growth systems are generally recognized to use water, pesticides, and fertilizers more efficiently, to require minimal land, to permit a more efficient and consistent uptake of nutrients, and to permit greater plant growth within less time (Asao at pages 101-102, 226).

Hydroponic systems are generally classified as "open" (or non-recycling), wherein the nutrient solution goes through the system once and is then discarded, or "closed" (or recycling), wherein the nutrient solution is reused and often supplemented after several cycles by the addition (renewal) of water or nutrients (Christie at 1). For this reason, closed systems use less water and nutrients, and protect the environment from nutrient run-off, but require additional monitoring and maintenance as compared to open hydroponic systems (Christie at 1-2, 10-11).

Traditional hydroponic systems require infrastructure such as reservoirs and energy to supply plants with the mineral nutrient solution and, at least for closed systems, pumps to circulate the mineral nutrient solution (Christie 10-11). Further, successful hydroponic growth systems require monitoring and maintenance by persons knowledgeable about plant science and with expensive tools and materials (Asao page 102). For example, to monitor the ion content of the mineral nutrient solution, direct measurement is preferred (Christie at page 17). Although ion-specific electrodes are available, they are expensive and are not specific for the full profile of ions present in hydroponic nutrient solutions (Christie at page 17). Spectrophotometry is an alternative to using ion-specific electrodes but is similarly expensive (Christie at page 17). In addition, it is necessary to monitor and prevent algae growth within any moist, nutrient media that has even minimal exposure to light (such as the mineral nutrient solution within a traditional hydroponic system). This is because algae may clog the tubes and pumps of traditional hydroponic systems, algae depletes nutrients from the hydroponic mineral nutrient solution, and may further suffocate plants if the algae grows directly on plant roots. The greatest impediment to wide-spread use of hydroponic systems is the cost of constructing and maintaining them (Christie 10-11; Asao pages 16, 102, 108-109, 226, 231). For this reason, hydroponic growth systems remain more expensive than soil-based growth. Thus the use of traditional hydroponic systems at a level sufficient to meet food demands, for example, has been limited to high economic value crops and by persons having sufficient resources for their construction and maintenance (Asao pages 16, 102, 108-109, 226, 231).

While others have developed hydroponic systems said to reduce infrastructure requirements and/or the total cost of the system (see, e.g., U.S. Pat. Nos. 8,677,685; 8,621,781; 5,394,647; 5,067,275; U.S. Pre-grant Publication No. 2015/0007498; U.S. Pre-grant Publication No. 2014/0075841; and U.S. Pre-grant Publication No. 2011/0067301), these systems nonetheless require a pump, two or more reservoirs to hold nutrient solution or other (possibly a second) media, pulley systems, areas within which solution may flow, and/or replenishment of nutrient solution.

For greater accessibility to hydroponically grown plants, there remains a need for simplified hydroponic plant growth systems having reduced infrastructure, monitoring and maintenance requirements as compared to traditional hydroponic systems.

Macronutrients are the essential elements and minerals that are required at relatively large quantities by a plant for the plant's normal (wild type) growth and development (see Resh at pages 34-37; N. K. Fageria et al., *Foliar Fertilization of Crop Plants*, 32 J. of Plant Nut. 1044, 1045 (2009) (hereinafter Fageria)). The macronutrients include the non-mineral nutrients carbon (C), hydrogen (H), and oxygen (O) as well as the mineral nutrients phosphorus (P), potassium (K), calcium (Ca), magnesium (Mg), and sulfur (S) (see Resh at pages 34-37; Fageria at 1045). Micronutrients are the essential elements and minerals that are required at relatively small quantities by a plant for the planes normal (wild type) growth and development (see Resh at pages 34-37; Fageria at 1045). The micronutrients include the mineral nutrients iron (Fe), chlorine (Cl), manganese (Mn), boron (B), zinc (Zn), copper (Cu), and molybdenum (Mo) (see Resh at pages 34-37; Fageria at 1045).

The absorption of mineral nutrients through plant roots is different than that through plant foliage; mineral nutrients may only be absorbed through plant foliage when, for example, the mineral nutrients are in appropriate concentrations (Fageria at 1045). While others have used foliar application to meet a plant's nutritionally required mineral nutrient(s) (including in soilless growth conditions), successful foliar nutrient application to plants has been limited to mere supplementation (i.e., most of the plant's nutritionally required mineral nutrients (51% or more) are provided by root-feeding) (Resh at pages 55-59; Fageria at 1045, 1049-1060). This is at least because macronutrients are required at such high amounts that the leaves of some plants are damaged by the foliar application of its nutritionally required mineral macronutrients (Fageria at 1045, 1049-1060). This is further at least because some macronutrients and many micronutrients are immobile after absorption into the foliage of a plant, resulting in perhaps a temporary correction of a nutrient deficiency but long term damage due to the build-up of mineral nutrients on the foliage and nutrient deficiency in newly grown plant tissue(s) (Fageria at 1045, 1049-1060). For these reasons, the foliar application of mineral nutrients, even at levels that only supplement the root-uptake of mineral nutrients, has produced inconsistent results depending on the plant species, nutrient or nutrient combination applied, and amount of nutrient(s) applied (Fageria at 1050-1052, 1059). To date, the recommendation by the art is that, while in certain circumstances foliar application is the most effective means to correct a nutrient deficiency, the foliar application of micronutrients is preferred to that of macronutrients and a plant should be root-fed most of its nutritionally required macronutrients (Fageria et al. at 1045, 1049-1060). In fact, Fageria et al. state clearly that "foliar fertilization cannot substitute for soil application" (Fageria. at 1060) and Stevens makes clear that "[e]ven with improved formulations using effective adjuvants, foliar fertilizers must be regarded as supplements to overcome deficiencies in micronutrients, and to boost macronutrients at critical physiological stages, rather than as substitutes for soil-applied [i.e., root-applied] fertilizers" (Stevens at pages 27, 32), Especially with respect to simplified hydroponic plant growth systems having reduced infrastructure, monitoring and maintenance requirements as compared to traditional hydroponic systems, there remains a need for a foliar feed formulation that may supply a plant with essentially all of its nutritionally required mineral nutrients (i.e., nutritionally required mineral macronutrients and micronutrients) which overcomes the limits of traditional foliar supplements.

BRIEF SUMMARY OF THE INVENTION

The present invention provides a method of nourishing a leafy vegetable plant through its foliage comprising: applying a feed formulation to a leaf of said leafy vegetable plant, wherein (a) the roots of the plant are in contact with an incomplete water solution that comprises less than a full complement of the plant's nutritionally required mineral nutrients; and (b) the feed formulation comprises a substantially full complement of the plant's nutritionally required mineral nutrients, and an effective amount of a penetrant.

The invention further provides a leafy vegetable plant, wherein (a) the roots of the plant are in contact with an incomplete water solution that comprises less than a full complement of the plant's nutritionally required mineral nutrients; and (b) a leaf of the plant is in contact with a foliar feed formulation comprising a substantially full complement of the plant's nutritionally required mineral nutrients, and an effective amount of a penetrant.

The invention also provides a hydroponic system for feeding a leafy vegetable plant through its foliage comprising: (a) a means for applying a foliar feed formulation to a leaf of a leafy vegetable plant, (b) a means for facilitating contact of the roots of the plant with an incomplete water solution, (c) a leafy vegetable plant, wherein (1) the roots of the plant are in contact with an incomplete water solution that comprises less than a full complement of the plant's nutritionally required mineral nutrients; and (2) a leaf of the plant is in contact with a foliar feed formulation comprising a substantially full complement of the planes nutritionally required mineral nutrients, and an effective amount of a penetrant.

The invention also provides a foliar feed formulation for a leafy vegetable plant comprising nutritionally effective amounts of: a nitrogen source, a phosphorus source, a potassium source, a calcium source, a magnesium source, a sulfur source, a zinc source, a copper source, an iron source, a manganese source, a boron source, a molybdenum source, a chlorine source, a nickel source, and a penetrant, wherein administration of said foliar feed formulation to a leaf of said plant supplies a substantially full complement of the plant's nutritionally required mineral nutrients when the roots of said plant are (i) not in substantial contact with soil or (ii) are in contact with an incomplete water solution that comprises less than a full complement of the plant's nutritionally required mineral nutrients.

The invention provides a hydroponic system that feeds a leafy vegetable plant through its foliage using a foliar feed formulation comprising the plant's nutritionally required mineral nutrients. The invention therefore does not require that the mineral nutrients be fed through the plant roots as is the case in traditional root-fed hydroponic systems. In this invention, the roots of the plant may be in contact with only an incomplete water solution that comprises just hydrogen and oxygen. In such case, carbon would be taken up by photosynthesis.

The present invention requires less infrastructure, monitoring, and/or maintenance than traditional hydroponic systems because it does not require, for example, the assaying of a root-applied mineral nutrient solution for ion composition and supplementing (renewing) of any essential nutrients. The tools and knowledgeable persons for performing such assays or supplementation are likewise not required. As a consequence, the present invention can be used not only in geographic areas where soils are devoid of essential mineral nutrients (as is the case with traditional hydroponic systems), but also in economic areas that do not have or cannot afford complex and expensive traditional hydroponic infrastructure.

BRIEF DESCRIPTION OF THE DRAWINGS/FIGURES

FIG. 1 (hereinafter FIG. 1) depicts the number of leaves on experimental and control plants when grown as is described within Example 3. See also Table 2. The measurements for cups 1 to 5 are given bottom to top, respectively. Data obtained at week 3. week 4, week 5, and week 6 is presented in that order from left to right.

FIG. 2 (hereinafter FIG. 2) depicts the length of the longest leaf, in centimeters (cm), of experimental and control plants when grown as is described within Example 3. See also Table 3. The measurements for cups 1 to 5 are given bottom to top, respectively. Data obtained at week 3, week 4, week 5, and week 6 is presented in that order from left to right.

FIG. 3 (hereinafter FIG. 3) depicts the width of the longest leaf, in centimeters (cm), of experimental and control plants when grown as is described within Example 3. See also Table 4. The measurements for cups 1 to 5 are given bottom to top, respectively. Data obtained at week 3, week 4, week 5, and week 6 is presented in that order from left to right.

FIG. 4 (hereinafter FIG. 4) depicts the length of the petiole of the longest leaf, in centimeters of experimental and control plants when grown as is described within Example 3. See also Table 5. The measurements for cups 1 to 5 are given bottom to top, respectively. Data obtained at week 3, week 4, week 5, and week 6 is presented in that order from left to right.

FIG. 5 (hereinafter FIG. 5) depicts a hydroponic system and, specifically, shows a top view of an experimental cup as described within Example 3. As is shown, the experimental cup is attached to a raft and the roots of the plant growing within the cup have passed through the cup perforations. The roots of the plant were submerged in river water during growth. FIG. 5 shows the top view after the cup and raft have been lifted from the river.

FIG. 6 (hereinafter FIG. 6) depicts a hydroponic system and, specifically, shows a side view of an experimental cup as described within Example 3. As is shown, the experimental cup is attached to a raft and the roots of the plant growing within the cup have passed through perforations within the cup. The roots of the plant extend pass the raft structure and toward the incomplete water solution (here, river water). The roots of the plant were submerged in river water during growth. FIG. 6 provides a side view after the cup and raft have been lifted from the stream.

FIG. 7 (hereinafter FIG. 7) depicts a hydroponic system and, specifically, shows a side view of a raft to which several experimental and control cups have been attached. The experimental and control cups are as described in Example 3. FIG. 7 further depicts the roots of the plants extending toward the depicted incomplete water solution (river water). The roots of the plant were submerged in river water during growth. FIG. 7 provides a side view after the cup and raft have been lifted from the stream.

DESCRIPTION OF THE INVENTION

General Definitions

Figure 1:
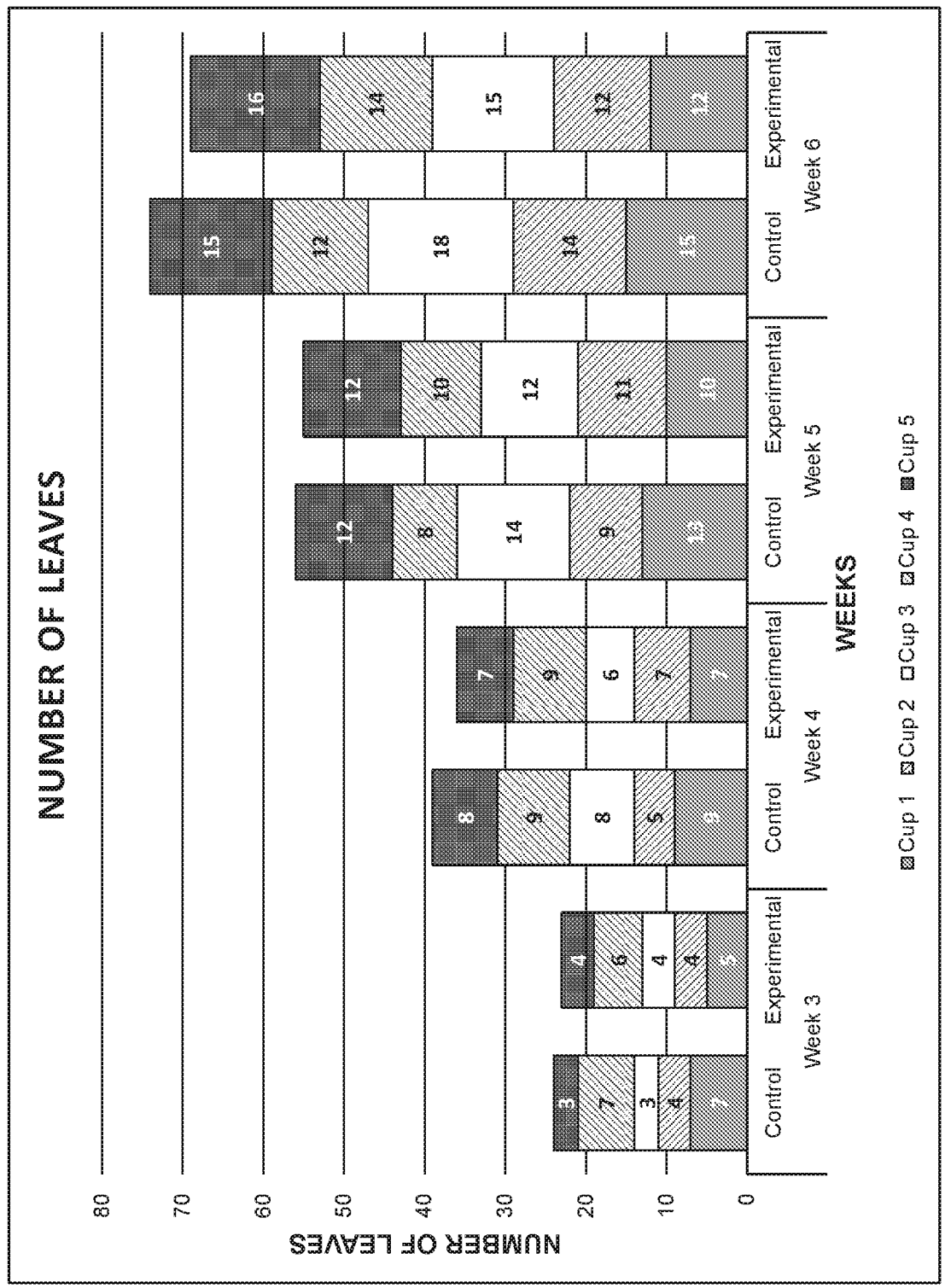
Figure 2:
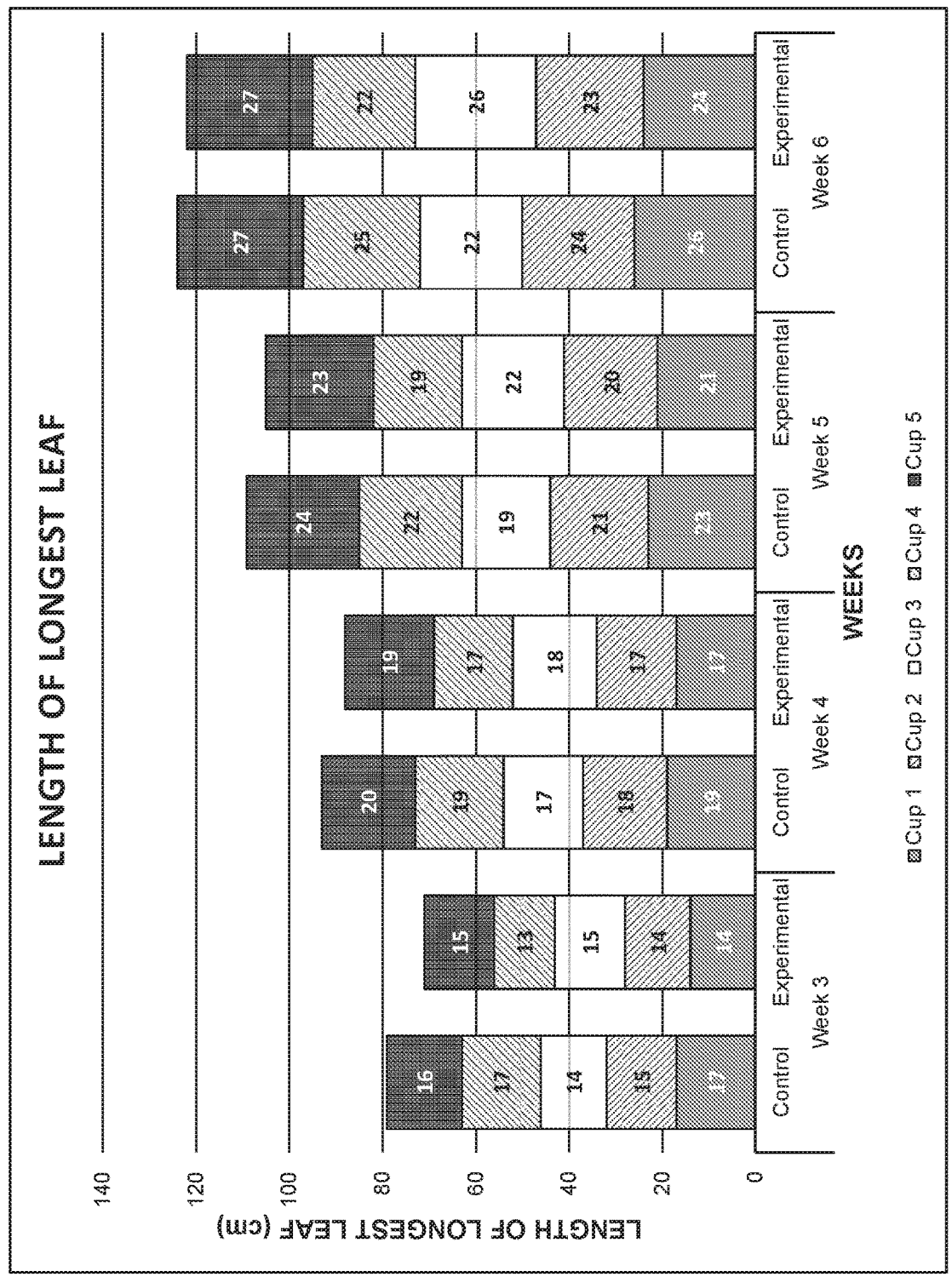
Figure 3:
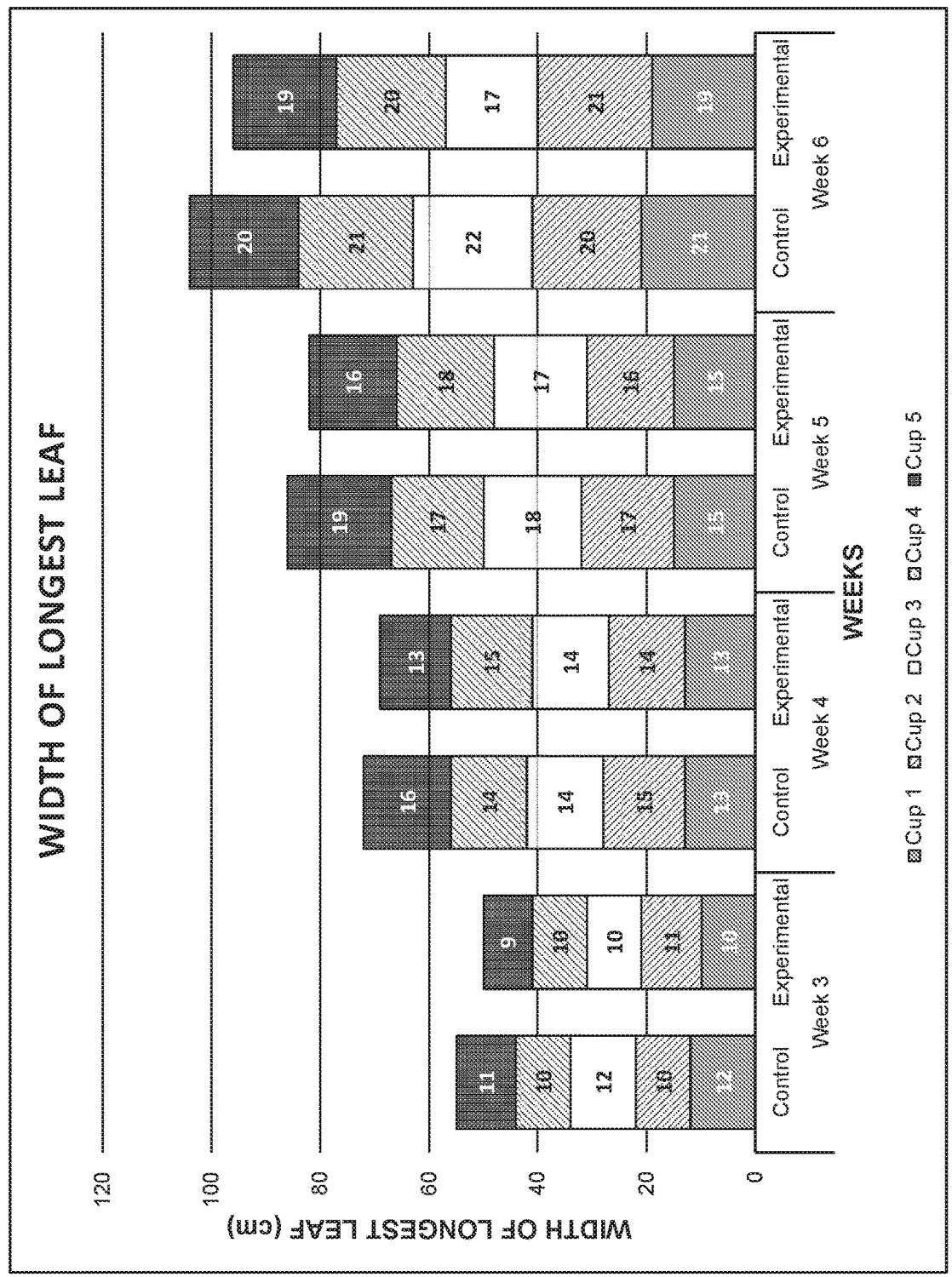
Figure 4:
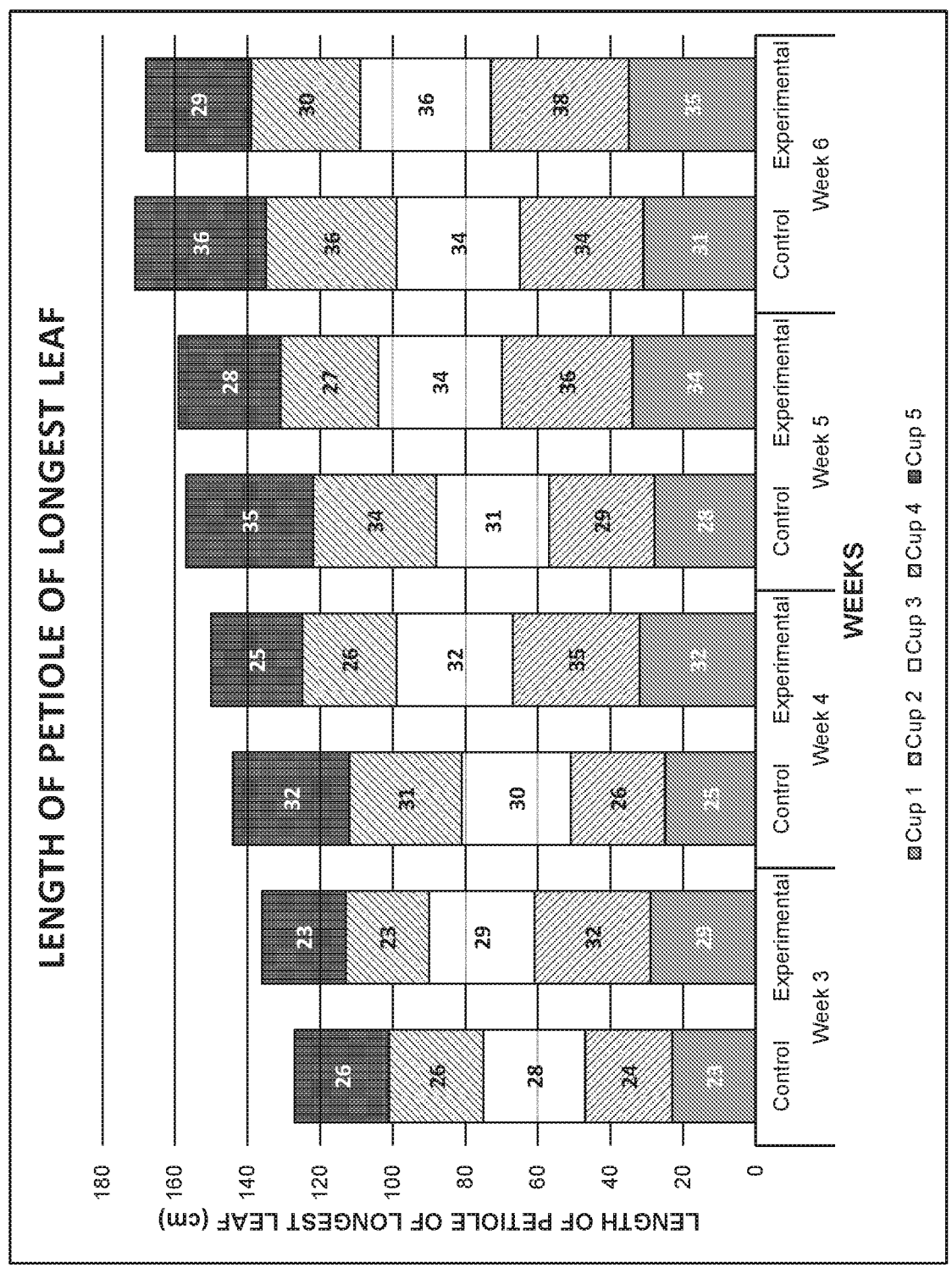
Figure 5:
Figure 6:
Figure 7:
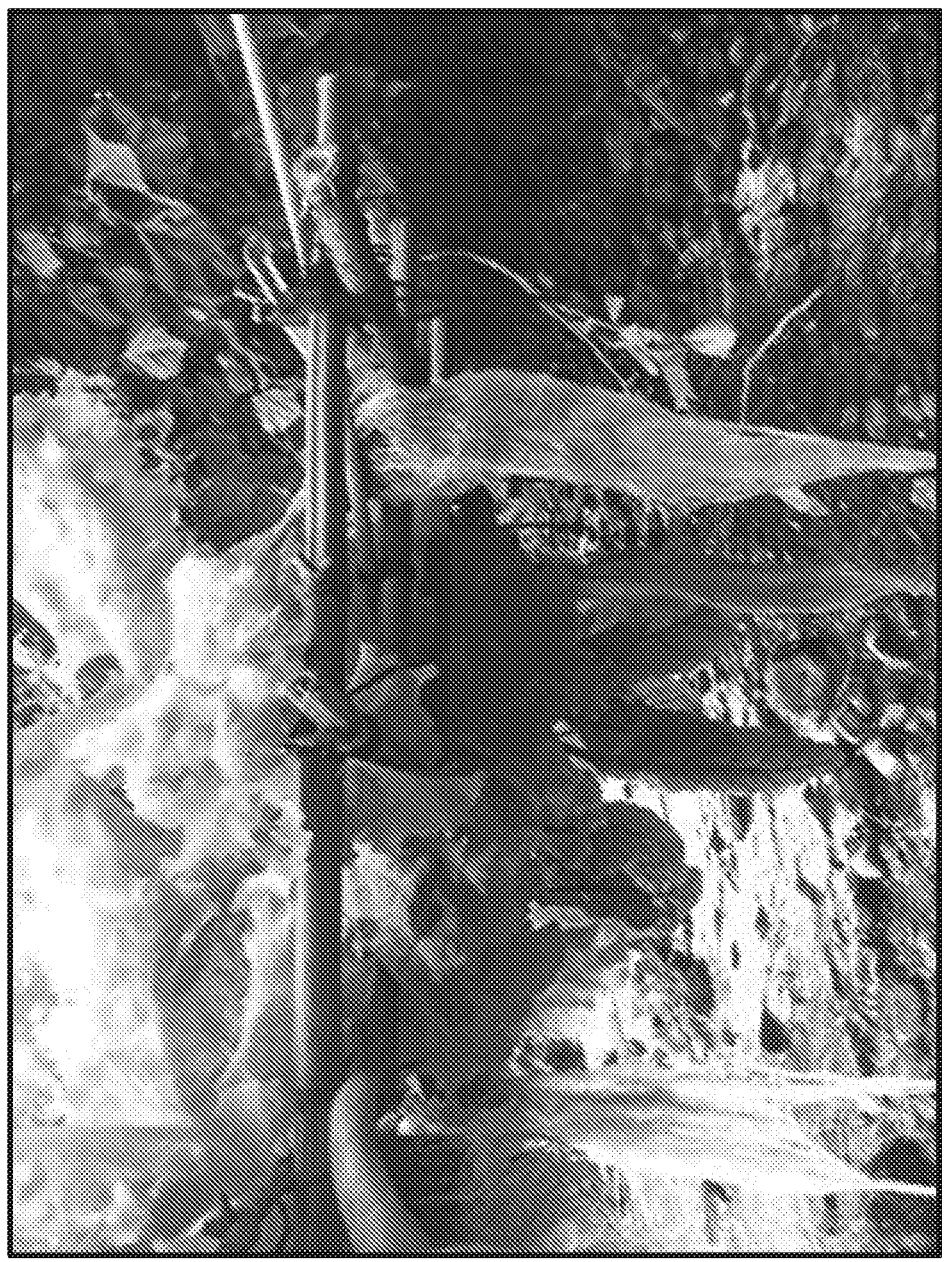

To facilitate an understanding of the present invention, a number of terms and phrases are defined below. Art-recognized synonyms or alternatives of the following terms and phrases, even if not specifically described, are contemplated.

As used in the present disclosure and claims, the singular forms "a," "an," and "the" include plural forms unless the context clearly dictates otherwise; i.e., "a" means "one or more" unless indicated otherwise.

The terms "about" or "approximately" mean roughly, around, or in the regions of. The terms "about" or "approximately" further mean within an acceptable contextual error range for the particular value as determined by one of ordinary skill in the art, which will depend in part on how the value is measured or determined, i.e. the limitations of the measurement system or the degree of precision required for a particular purpose, e.g. the amount of a nutrient within a feeding formulation. When the terms "about" or "approximately" are used in conjunction with a numerical range, it modifies that range by extending the boundaries above and below the numerical values set forth. For example "between about 5.5 to 6.5 g/l" means the boundaries of the numerical range extend below 5.5 and above 6.5 so that the particular value in question achieves the same functional result as within the range. For example, "about" and "approximately" can mean within 1 or more than 1 standard deviation as per the practice in the art. Alternatively, "about" and "approximately" can mean a range of up to 20%, preferably up to 10%, more preferably up to 5%, and more preferably up to 1% of a given value.

The term "and/or" as used in a phrase such as "A and/or B" is intended to include "A and B," "A or B," "A," and "B." Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

Unless specified otherwise, all of the designations "A%-B%," "A-B%," "A% to B%," "A to B%," "A%-B," "A% to B" are given their ordinary and customary meaning. In some embodiments, these designations are synonyms.

An "incomplete water solution" is a source of $H_2O$ that does not comprise all of a plant's nutritionally required mineral nutrients. Preferably, an incomplete water solution in this invention comprises an incomplete profile of (less than a full complement of) a plant's nutritionally required mineral nutrients. Such incomplete water solution may be, for example, from fresh bodies of water including surface water of a river, stream, glacier, bog, aquifer, pond, canal, or lake that comprises high amounts of a certain mineral nutrient but insufficient amounts of, or no amounts of, another mineral nutrient. preferably, An incomplete water solution comprises trace amounts of mineral nutrients. Such incomplete water solution may be, for example, groundwater or well water, or water provided by a municipality (e.g., tap water) (see Christie at 15). An incomplete water solution may comprise filtered water. Most preferably, an incomplete water solution comprises no detectable amounts of at least one or more mineral nutrient. Such incomplete water solution may be, for example, deionized (DI) water. For embodiments of the presently describe d hydroponics system wherein the incomplete water solution comprises fresh water (water retrieved from fresh bodies of water or that is groundwater, well water, filtered water, or DI water, for example), the system may be referred to as a "freshwaterponics" system. For embodiments of the presently described hydroponics system wherein the incomplete water solution comprises fresh water retrieved from a river, a stream, or a similar flowing body of water, the system may be referred to as a "riverponics" system. An incomplete water solution of the present invention may be added to or be in contact with an inert medium wherein the inert medium does not supply a plant with the plant's nutritionally required mineral nutrients. Exemplary inert mediums include sand, gravel, peat, clay pellets, vermiculite, pumice, perlite, coco coir, sawdust, rice hulls, mineral wool, foam, sponge, polyurethane grow slabs, and coconut husk (see, e.g., Resh at 2; Asao at preface). In certain embodiments, the incomplete water solution of the present invention has a pH of about 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, or 6.5. In certain embodiments, the incomplete water solution of the present invention has a pH of between about 4.5 and 5.0, 5.0 and 5.5, 5.5 and 6.0, or 6.0 and 6.5.

The terms "substantially" or "substantial" mean that the condition described or claimed functions in all important aspects as the standard described. Thus, "substantially free"

is meant to encompass conditions that function in all important aspects as free conditions, even if the numerical values indicate the presence of some impurities or substances. A substance that is "not in substantial contact with soil" is in conditions that function in all important aspects as having no contact with soil. "Substantial" generally means a value greater than 90%, preferably greater than 95%, most preferably greater than 99%. Where particular values are used in the specification and in the claims, unless otherwise stated, the term "substantially" means with an acceptable error range for the particular value.

The term "penetrant" means a substance that aids in the movement of a mineral or compound across the waxy layers or cuticle of a plant. A "penetrant" may be a humectant (a hygroscopic substance that can, therefore, attract and hold water molecules (see, e.g., P. J. G. Stevens, *Formulation of Sprays to Improve the Efficacy of Foliar Fertilisers*, 24 New Zealand J. of Forestry Sci. 27, 30 (1994) (hereinafter Stevens); U.S. Pat. No. 3,657,443). Humectants are known by the art and include, for example, glycerine, ethylene, glycol, propylene glycol, polyethylene glycole, sorbitol, sodium lactate, and sodium polyacrylate (U.S. Pat. No. 3,657,443). A "penetrant" may also be a "sticking agent" (has the effect of increasing the adhesion between two or more substances) Sticking agents are known by the art and include, for example, carboxymethyl cellulose; casein; latex based products like Prolong® (Holland Fyto B.V., The Netherlands) and Bond® (Loveland Industries Ltd); pinolene/terpene based products like Nu-film® (Hygrotech Saad) and Spray-Fast® (Mandops); long chain polysaccharides like xanthan gum, gellan gum and guar gum; polymer or copolymer from a type of polymer such as polyacrylate and polyethylene (e.g., Neocryl® (DSM, The Netherlands); and CAPSIL® (AQUATROLS®, Paulsboro New Jersey) (see, e.g., Midwest Laboratories, FOLIAR NUTRITION, 8-13 (1994) (hereinafter Midwest Laboratories); U.S. Pat. Nos. 9,078,401; 8,729,342; 5,780,390; 5,424,072; 2,481,100; U.S. Pre-grant Publication No. 2003/0125212; see also Fageria at 1058). Preferably, a penetrant is an adjuvant. Preferably, a penetrant is a solvent, surfactant, wetting agent, or detergent. Preferably, a penetrant is a nonionic surfactant. Most preferably, a penetrant is a polar aprotic solvent or an anionic detergent. An effective amount of a particular penetrant which may be added to, for example, a foliar feed formulation so as to have a penetrating, humectant, and/or sticking effect is known by a person having skill in the art or may be determined using routine experimentation and known techniques. See e.g., U.S. Pat. Nos. 9,078,401; 8,729,342; 5,780,390; 5,424,072; 2,481,100; U.S. Pre-grant Publication No. 2003/0125212; Fageria at 1058; Stevens at 28-31; Midwest Laboratories).

The term "biocompatible" means that the referenced thing or activity is able to perform its desired function without having an injurious, undesired, or toxic biological effect on a plant or on an animal (e.g., a human) ingesting it. For example, a biocompatible polar aprotic solvent that is applied to a plant is a solvent that has polar aprotic solvent properties but does not have an injurious, undesired, or toxic effect on the plant or humans. Similarly, for example, a biocompatible anionic detergent that is applied to a plant is a detergent having anionic detergent properties but does not have an injurious, undesired, or toxic effect on the plant or humans.

A "solvent" is a substance able to dissolve other substances. A solvent is not limited to being in a liquid state. A solvent may be, for example, a solid.

A "polar aprotic solvent" is a solvent with a partial charge (a dipole moment) but that cannot form hydrogen bonds. A polar aprotic solvent is preferably dichloromethane, tetrahydrofuran, ethyl acetate, acetonitrile, dimethylformamide (DMF), dimethyl sulfoxide (DMSO), acetone, or hexamethylphosphoric triamide (HMPT). A polar aprotic solvent is preferably DMF or DMSO. DMSO is the most preferred polar aprotic solvent.

A "detergent" is a "surfactant" or "wetting agent" and therefore lowers the surface tension between two other substances. A detergent also solubilizes a substance by, for example, dissociating aggregates or unfolding proteins.

An "anionic detergent," also referred to as an "anionic surfactant," is a detergent with a net negative charge (Manisha mishra et al., *Basics and Potential Applications of Surfactants-A Review*, I International J. of PharmTech Rsch. 1354 (2009) (hereinafter Manisha mishra)). Preferably an anionic detergent is an alkylbenzene sulfonate, a secondary alkane sulfonate (SAS) including an alkylethoxy sulfonate, an olefinsulfonate, an ester sulfonate, a fatty acid isothionate, a sulfosuccinate ester, a sulfonated amide, a sulfate ester, a carboxylate (soap) including a sulfosuccinate, a phosphate ester, or a fluorinated surfactant (see, e.g., U.S. Pre-grant Publication No. 2006/0019830). Specific examples of such anionic detergents are known by the art and include, for example, sodium cocoyl isethionate (ISE), sodium lauryl sulfate (SLS), sodium lauryl ether sulfate (SLES), disodium lauryl 3-ethoxysulfosuccinate (SUC), perfluorooctanoate (PFOA or PFO), perfluorooctanesulfonate (PFOS), sodium dodecyl sulfate (SDS), ammonium lauryl sulfate, ammonium tallowate, sodium stearate, sodium lauryl ether sulfate (SLES), sodium oleyl sulfate, sulfated castor oil, ammonium lauryl ether sulfate, ammonium nonylphenol ether sulfate, petroleum sulfonates, sodium (linear) dodecylbenzene sulfonate, sodium (branched) dodecylbenzene sulfonate, sodium dibutylnapthalene sulfonate, alpha olefin sulfonates, sodium dioctylsulfosuccinate, disodium laurylsulfosuccinate, disodium N-alkylsulfosuccinamate, sodium N-methyl N-coco taurate, sodium cocoyl isethionate, N-lauroyl sarcosine, alkyl benzene sulfonate, calcium dodecylbenzene sulphonate, sulphated or phosphated fatty alcohols/fatty alcohol polyethers, fatty acid salts, alky polyether carboxylates and their salts (see, e.g., U.S. Pat. No. 8,017,566; U.S. Pre-grant Publication No. 2006/0019830; U.S. Pre-grant Publication No. 2012/0312059).

"Nonionic surfactants" include, but are not limited to, alkyl polyethylene oxide, alkylphenol polyethylene oxide, copolymers of polyethylene oxide and polypropylene oxide (i,e., poloxamers or poloxamines), alkyl polyglucosides such as octyl glucoside and decyl maltoside, fatty alcohols such as cetyl alcohol and oleyl alcohol, cocamide MEA, cocamide DEA, and polysorbates such as Tween 20, Tween 80, and dodecyl dimethylamine oxide (see, e.g., U.S. Pat. Nos. 9,078,401; 3,657,443; Stevens; Midwest Laboratories).

An "effective amount" means an amount sufficient to cause the referenced effect or outcome. An "effective amount" can be determined empirically and in a routine manner using known techniques in relation to the stated purpose.

"Essentially free," as in "essentially free from" or "essentially free of," means comprising less than a detectable level of a referenced material or comprising only unavoidable levels of a referenced material. For example, an incomplete water solution that comprises only trace amounts of a mineral nutrient is essentially free of mineral nutrients. In certain embodiments, "not in substantial contact with soil," for example, is equivalent to "essentially free from contact with soil."

The terms "applying," "applied," "application" and other tenses thereof refer to causing, or having caused, contact between two substances. Unless stated otherwise, the way in which application is made is not limited. For example, application of a feed formulation onto a plant may be via, for example, spraying, misting, dropping, dripping, soaking, throwing, spreading, brushing, dipping, dunking, or submerging. See, e.g., U.S. Pat. Nos. 8,919,038; 5,557,884; 5,394,647; 5,073,401; 4,965,962; 4,756,120; 4, 607,454; 4,468,885; 4,399,634; 4,279,101.The terms "supply," "supplies," "supplying," "supplied" and other tenses thereof refer to providing, or making available, the reference substance(s). The bioavailability of a substance, or the proportion of the absorbed substance that is utilized for normal (wild type) metabolic and/or physiological function or storage, may be specified.

The terms "in contact with," "contacting," "contact," and other tenses thereof refer to a touching of two or more reference substances. Unless stated otherwise, the way in which a first substance is in contact with at least a second substance is not limited. In certain embodiments, "in contact with" means "coated" or "covered" with at least a second substance. In such embodiments, it may be specified that the second substance is non-solid state of matter such as, for example, a liquid, steam, mist, or fog. In some embodiments and when the second substance is a liquid, the first substance being "at least about 80% in contact" with a second substance means the first substance is "submerged" within the second substance. It may be specified that a first substance is "partially submerged." (at least about 80% but less than 100% submerged) or "completely submerged" (100% submerged) within the second substance. It may be specified that a percent range of a first substance's surface area or length is in contact with an at least one second substance. For example, it may be specified that between about 1%-5%, 1%-10%, 5%-10%, 5%-15%, 10%-15%, 10%-20%, 15%-20%, 20%-30%, 20%-25%, 20%-30%, 30%-35%, 30%-40%, 35%-40%, 35%-45%, 40%-45%, 40%-50%, 45%-50%, 45%-55%, 50%-55%, 50%-60%, 55%-60%, 55%-65%, 60%-65%, 60%-70%, 65%-70%, 65%-75%, 70%-75%, 70%-80%, 75%-80%, 75%-85%, 80%-85%, 80%-90%, 85%-90%, 85%-95%, 90%-95%, 90%-100%, 95%-100% of the surface area or length of a first substance is in contact with a second substance. It may be further specified that a percentage of a first substance's surface area or length is contacted. For example, it may be specified that about or at least about 1%, 2%, 3%, 4%, 5%, 10%, 20%, 30%, 40%, 50%, 60%, 70%, 80%, 85%, 90%, 95%, 96%, 97%, 98%, 99% or 100% of the surface area or length of a first substance is in contact with a second substance. Preferably, the first substance is a plant or plant part. Preferably, the first substance is the plant roots. Preferably, the second substance is an incomplete water solution. Preferably, the second substance is an incomplete water solution essentially free of mineral nutrients. Most preferably, the first substance is submerged in the second substance, the first substance is the plant roots, and the second substance is an incomplete water solution essentially free of mineral nutrients. Means for coating plant roots with an incomplete water solution includes a receptacle into which the roots may be placed (e.g., a tank, reservoir, or tub); a spray dispenser (e.g., a spray bottle or a hose); a. fog or mist machine, a droplet dispenser; an absorbent article comprising natural or synthetic material(s) that may hold (absorb) the incomplete water solution and be fastened to the plant roots (e.g., cloth, string, moss, felt, tape, sponge, or foam). See, e.g., U.S. Pat. Nos. 8,919,038; 5,557,884, In certain embodiments (e.g., freshwaterponics or riverponics systems), a means for coating plant roots with an incomplete water solution is a carrier in contact with the incomplete water solution (e.g., the body of freshwater or river).

The terms "carrier" and "support structure(s)" refer to a device able to hold a plant or plant part in a particular position. Preferably, a carrier holds the shoot of a plant in an upright position and so that the plant roots may be in contact with an incomplete water solution. Preferably, a carrier is a raft holding or floating the shoot of a plant out of an incomplete water solution and yet permitting the roots of the plant to be submerged within the incomplete water solution. Most preferably the carrier is a float, raft, or cup (a "net cup" or "net pot") supporting the plant shoot and comprising holes sufficient for the roots of a plant to be submerged within an incomplete water solution. Means for carrying or supporting the shoot of a plant while permitting the roots of the plant to be submerged within an incomplete water solution include a raft, a float, a cup (e.g., a net cup), and a suspension clamp and an anchoring cable or stake, (U.S. Pat. Nos. 8,919,038; 5,073,401; 5,557,884; 5,394,647; 4,965, 962; 4,756,120; 4, 607,454; 4,468,885; 4,399,634; 4,279, 101; Resh at pages 129-149)

The growth, development, and/or yield of a plant or plant part produced by a presently described hydroponic system may be compared to a plant or plant part of the same type (plant species) that was fed or nourished via root-feeding with soil or, for example, a water culture hydroponic system wherein the water culture supplies the roots with all of the plant's nutritionally required mineral nutrients. It may be specified that the plant or plant part described herein has about a 1%, 2%, 3%, 4%, 5%, 10%, 20%, 30%, 40%, 50%, 60%, 70%, 80%, 85%, 90%, 95%, 96%, 97%, 98%, 99% or 100%, 101%, 102%, 103%, 104%, 105%, 110%, 115%, 120%, 130% increase or decrease in growth, development, and/or yield as compared to the same plant type that is root-fed during growth. It may be specified that the percent increase or decrease is a rate percent (e.g., a 1% increase in the rate of head formation as compared to a comparable root-fed plant) or yield measurement percent (e.g., a 1% increase in the length of the longest leaf as compared to a root-fed plant of the same type). Likewise, it may be specified that a plant or plant part grown as described herein has a 1-, 1.5-, 2-, 2.5-, 3-, 3.5-, 4-, 4.5- or 5-fold increase or decrease in growth, development, and/or yield as compared to the same plant type that is root-fed during growth. It may be specified that the fold increase or decrease is a rate percent (e.g., a 1-fold increase in the rate of head formation as compared to a comparable root-fed plant) or fold increase in a yield measurement (e.g., a 1-fold increase in the length of the longest leaf as compared to a root-fed plant of the same type).

Nutrient Definitions

The terms "nourishing," "nourishment," "nourished," "nourish," and other tenses of thereof refer to making available to a plant all of its nutritionally required nutrients. In sonic embodiments, "nourishment" refers to either having made all of the nutritionally required nutrients available to the plant or the composition itself that provided those nutrients to the plant. In further embodiments, "nourishing" is a synonym for "feeding." Preferably, nourishing a plant refers to providing to a plant all of the plant's nutritionally required mineral nutrients (i.e., the plant's carbon, oxygen, and hydrogen needs may be met by, in addition to nourishing, exposure to the atmosphere) and, optionally, an additive. What constitutes a plant's nutritionally required nutrients and nutritionally required mineral nutrients as well as whether or not such nutrients have been provided to the plant are well understood by those of skill in the art and may be determined by routine experimentation using known techniques. See, e.g., Agronomic Division of the N.C. Dept. of Agriculture & Consumer Services, NCDA&CS PLANT TISSUE ANALYSIS GUIDE (McGinnis et al., eds. 2014) (hereinafter McGinnis); Univ. of Arizona. Cooperative Extension, GUIDE TO SYMPTOMS OF PLANT NUTRIENT DEFICIENCIES (Hosier et al., eds. 1999) (hereinafter Hosier); Montana State University Extension, PLANT NUTRIENT FUNCTIONS AND DEFICIENCY AND TOXICITY Symptoms (McCauley et al., eds. 2011) (hereinafter McCauley); Soil and Plant Analysis Council, Inc., HANDBOOK OF REFERENCE METHODS FOR PLANT ANALYSIS (Yash P. Kalra, ed., 1998) (hereinafter Kalra); Muñoz-Huerta et al., *A Review of Methods for Sensing the Nitrogen Status in Plants: Advantages, Disadvantages and Recent Advances*, 13 Sensors 10823 (2013) (hereinafter Muñoz-Huerta); Tezotto et al., *Simple Procedure for Nutrient Analysis of Coffee Plant with Energy Dispersive X-ray Fluorescence Spectrometry (EDXRF)*, 70 Sci. Agric. 263 (2013) (hereinafter Tezotto); Resh pages 34-118.

The terms "feed," "fed," "feeding" and other tenses thereof refer to providing a plant with sufficient amounts of the nutrients the plant requires for normal (wild type) growth and development. In some embodiments, "feeding" is a synonym for "nourishing." Preferably, feed refers to applying a substance that comprises all of the plant's nutritionally required nutrients to a plant. Preferably, feed refers to applying a substance that comprises the plant's nutritionally required mineral nutrients, and optionally an additive, to that plant (i.e., the plant's carbon, oxygen, and hydrogen needs may be met by, in addition to nourishing, exposure to the atmosphere). What constitutes a plant's nutritionally required nutrients and nutritionally required mineral nutrients as well as whether or not such nutrients have been provided to the plant are well understood by those of skill in the art and may be determined by routine experimentation using known techniques. See, e.g., McGinnis; Hosier; McCauley; Kalra; Muñoz-Huerta et al.; Tezotto et al.; Resh pages 34-118.

A "feed formulation," "feed solution," "nutrient formulation," "nutrient solution," "nourishment media," "nourishment solution," "nourishment formulation," or "nourishment composition" refers to a substance or composition that comprises a plant's nutritionally required nutrients and, optionally, an additive. Preferably, a feed formulation comprises a plant's nutritionally required mineral nutrients and, optionally, an additive (i.e., the feed formulation does not meet the plant's complete carbon, oxygen, and hydrogen needs and the plant therefore requires exposure to, for example, the atmosphere). Preferably, it is specified that the feed formulation is a foliar feed formulation and therefore a substance suited for application to plant foliage and thereby feeding the plant through its foliage.

The term "complement" means to meet or complete a requirement. In certain embodiments, "complement" refers to a thing or amount of a substance that meets or completes a requirement. For example, a "complement" of a plant's nutritionally required mineral nutrients means the amount of each mineral nutrient equal to that which is the plant's nutritional requirement for mineral nutrients (i.e., a "full complement"). It may be specified that "less than a full complement" of a requirement is provided. Where, for example, "complement" is used with respect to a plant's nutritionally required mineral nutrients, it may be specified that a full complement of a first mineral nutrient is provided but that a less than full complement of a second mineral nutrient is provided. It may be further specified that a percentage of a full complement is provided as in, for example, that about 1%, 2%, 3%, 4%, 5%, 10%, 20%, 30%, 40%, 50%, 60%, 70%, 80%, 85%, 90%, 95%, 96%, 97%, 98%, 99% or 100% of a full complement is provided by a referenced substance or action. It may be further specified that a range of percentages of a full complement is provided as in, for example, that between about 1%-5%, 1%-10%, 5%-10%, 5%-15%, 10%-15%, 10%-20%, 15%-20%, 20%-30%, 20%-25%, 20%-30%, 30%-35%, 30%-40%, 35%-40%, 35%-45%, 40%-45%, 40%-50%, 45%-50%, 45%-55%, 50%-55%, 50%-60%, 55%-60%, 55%-65%, 60%-65%, 60%-70%, 65%-70%, 65%-75%, 70%-75%, 70%-80%, 75%-80%, 75%-85%, 80%-85%, 80%-90%, 85%-90%, 85%-95%, 90%-95%, 90%-100%, 95%-100% of a full complement is provided.

"Essential," "vital," "required," and. "necessary" are given their ordinary and customary meaning. In certain embodiments, "Essential," "vital," "required," and "necessary" are synonyms.

"Nutritionally required" means the referenced substance or action is necessary to meet a plant's nutritional requirements for wild type growth and development. A substance is nutritionally required if a plant cannot complete its life cycle in the absence of the substance, no other substance can wholly substitute for it, and the substance is directly involved in the plant's nutrition (e.g., the substance is a constituent of a necessary metabolite or required for the action of a necessary enzyme) (Resh Pages 34-37; Fageria at 1045-1060). Whether a substance is nutritionally required by a plant are well understood by those of skill in the art and may be determined by routine experimentation using known techniques. See, e.g., McGinnis; Hosier; McCauley; Kalra; Muñoz-Huerta; Tezotto; Resh pages 34-118.

"Nutritionally-effective" or "nutritionally-sufficient" means an adequate amount and proportion of a referenced substance or group of substances to, for example, meet a. plant's nutritional requirements for wild type plant growth and development. What constitutes an adequate amount and proportion is well understood by those of skill in the art and may be determined by routine experimentation using known techniques. See, e.g., McGinnis; Hosier; McCauley; Kalra; Muñoz-Huerta; Tezotto; Resh pages 34-118.

"Nutrient-deficient," "nutritionally-deficient," or "nutritionally-defective" refers to less than an adequate amount and proportion of a referenced substance or group of substances that are required to meet the nutritional requirements for a plant's wild type growth and development. It may be specified that a reference is about 10%, 15%, 20%, 25%, 30%, 35%, 40%, 45%, 50%, 55%, 60%, 65%, 70%, 75%, 80%, 85%, 90%, 95%, 96%, 97%, 98%, 99% or 100% deficient for, for example, a specific nutrient or a group of nutrients that are required to meet the nutritional requirements of a plant for its wild type growth and development. Whether or not something is nutrient-deficient, and how to determine the same, is well understood by those of skill in the art and may be determined by routine experimentation using known techniques. See, e.g., McGinnis; Hosier; McCauley; Kalra; Muñoz-Huerta; Tezotto; Resh pages 34-118.

"Mineral nutrients" are essential elements and minerals needed by a plant for the plant's normal growth and development (Resh at 34-37; Asao at preface and pages 1-2). As used here, "mineral nutrients" excludes the macronutrients carbon, hydrogen, and oxygen. Carbon, hydrogen, and oxygen are non-mineral macronutrients primarily supplied to the plant by the atmosphere and water (Resh at 34-37; Asao at 2). "Mineral nutrients" may be used to refer to one of, some of, or all of a plant's nutritionally required mineral nutrients. In certain embodiments, for example, "mineral nutrients" may refer to a plant's nutritionally required mineral micronutrients. In another embodiment, for example, "mineral nutrients" may refer to a. plant's nutritionally required calcium, sulfur, and boron.

The term "additive" refers to a molecule or compound within, for example, a feeding formulation that is not nutritionally essential for plant growth and development. In certain embodiments, an additive is a fungicide (see U.S. Pat. Nos. 8,466,087; 7,098,170), a pesticide (which includes insecticides and bactericides) (see U.S. Pat. Nos. 8,466,087; 7,098,170), an herbicide (see U.S. Pat. Nos. 8,466,087; 7,098,170), a chelating agent such as ethylenediaminetetraacetic acid (EDTA), a cytokinin hormone (e.g., zeatin), a gibberellin hormone (e.g., gibberellic acid), lactic acid (see U.S. Pat. No. 4,863,506), thiamin, a penetrant, a dye, a fragrance-altering substance (including an oil or a flavonoid), an effective amount of a microorganism culture beneficial for plant growth (e.g., a culture of mixed, fermented microorganisms) ((see U.S. Pat. Nos. 8,097,280; 7,771,504; 6,228,806; U.S. Pre-grant Publication No. 2012/0015806), or combinations thereof. In other embodiments, an additive is a "nutrient additive" that, while not required, is a nutrient beneficial for plant growth. Such nutrient additives include iodine, cobalt, a source thereof, or combinations thereof.

The terms "macronutrient," "macroelement," and "major nutrient" refer to the essential elements and minerals that are required at relatively large quantities by a plant for the plant's normal (wild type) growth and development (see Resh at pages 34-37; Fageria at 1045). The macronutrients include the "non-mineral nutrients" carbon (C), hydrogen (H), and oxygen (O) as well as the mineral nutrients phosphorus (P), potassium (K), calcium (Ca), magnesium (Mg), and sulfur (S) (see Resh at pages 34-37; Fageria at 1045). The term "mineral macronutrients" refers to P, K, Ca, Mg, and/or S.

The terms "micronutrient," "microelement," and "minor nutrient" refer to the essential elements and minerals that are required at relatively small quantities by a plant for the plant's normal (wild type) growth and development (see Resh at pages 34-37; Fageria at 1045). The micronutrients include the mineral nutrients iron (Fe), chlorine (Cl), manganese (Mn), boron (B), zinc (Zn), copper (Cu), and molybdenum (Mo) (see Resh at pages 34-37; Fageria at 1045).

A "nitrogen source" or "nitrogen carrier" is a substance that, optionally through catabolism, can supply a plant with nitrogen, preferably in the form of ammonium nitrogen ($NH_4+$) or nitrate nitrogen ($NO_3-$). Sources of nitrogen are well known by the art and include, for example, ammonia ($NH_4+$), nitrate ($NO_3-$), urea, sulfur-coated urea, glutamine, alanine, glutamic acid, ammonium chloride (NH4Cl), potassium nitrate (KNO3), citrulline, or natural extracts in aqueous and/or non-aqueous solvents comprising citrulline, such as watermelon rind extract garlic extract, onion extract, fish extract (such as fish oil), arginine, ammonium nitrate (NH4NO3), calcium nitrate (Ca(NO3)2), ammonium sulfate ((NH4)2SO4), ascorbic acid (C6H8O6), ammonium phosphate ((NH4)3(PO4)), diammonium phosphate (DAP or (NH4)2(HPO4), monoammonium phosphate (MPA or NH4H2PO4), and mixtures thereof see, e.g., Resh at Table 3.2 and Table 3.1; Ludwig, *Arabidopsis Chloroplasts Dissimilate L-Arginine and L-Citrulline for Use as N source*, 101 Plant Physiol. 429 (1993)).

A "phosphorus source" or "phosphorus carrier" is a substance that, optionally through catabolism, may supply a plant with phosphorus, preferably in the form of dihydrogen phosphate ($H_2PO_4P^-$) or orthophosphate (($HPO)_4^{-2}$). Sources of phosphorus are well known by the art and include, for example, inorganic phosphate (Pi or $PO_4^{3-}$), dipotassium phosphate (K2HPO4), monopotassium phosphate (KH2PO4), phosphoric anhydride (P2O5), phosphate (PO4), boron phosphate (BPO4), diammonium phosphate (DAP or (NH4)2HPO4), monoammonium phosphate (MAP or NH4H2PO4), ammonium phosphate ((NH4)3(PO4)), acetoxyethyl ferrocene, binaphthyl diyl phosphorochloridate, rock phosphate, single superphosphate, triple superphosphate, phosphoric acid (H3PO4), inositol phosphates (including, for example, phytic acid (inositol hexaphosphate (IP6) or C6H18O24P6), myo-inositol, phytate (or pentainositol phosphate), inositol monophosphate, inositol macinate), fermented fruit extract comprising phosphorus and an aqueous or non-aqueous solvent, and mixtures thereof (see, e.g., Mesh at Table 3.2 and Table 3.1; U.S. Pat. No. 6,245,717].

A "potassium source" or "potassium carrier" is a substance that, optionally through catabolism, can supply a plant with potassium, preferably in the form of K+. Sources of potassium are well known by the art and include, for example, potash (potassium hydroxide or $K_2O$), potassium nitrate ($KNO_3$), monopotassium phosphate ($KH_2PO_4$), potassium chloride (KCL), potassium sulfate ($K_2SO_4$), potassium magnesium sulfate ($K_2SO_4(2MgSO_4)$), potassium iodide, fermented fruit extract comprising potassium and an aqueous or non aqueous solvent, and mixtures thereof.

A "calcium source" or "calcium carrier" is a substance that, optionally through catabolism, can supply a plant with calcium, preferably in the form of $Ca^{2+}$. Sources of calcium are well known by the art and include, for example, calcium oxide (CaO), calcium nitrate ($Ca(NO_3)_2$), calcium chloride ($CaCl_2(6H_2O)$), calcium sulfate ($CaSO_4(2H_2O)$), calcium carbonate ($CaCO_3$), calcium silicate ($Ca_2SiO_4$), rock phosphate, single superphosphate, triple superphosphate, calcium magnesium carbonate ($CaMg(CO_3)_2$), dolomite (providing calcium magnesium carbonate ($CaMg(CO_3)_2$), gypsum (providing calcium sulfate ($CaSO(2H_2O)$), monocalcium phosphate ($Ca(H_2PO_4)2H_2O$), shellfish shell extract comprising calcium and an aqueous or non aqueous solvent, and mixtures thereof (see, e.g., Resh at Table 3.2 and Table 3.1; U.S. Pat. No. 5,634,959).

A "magnesium source" or "magnesium carrier" is a substance that, optionally through catabolism, can supply a plant with magnesium, preferably in the form of $Mg_{2+}$. Sources of magnesium are well known by the art and include, for example, magnesium oxide (MgO), magnesium sulfate ($MgSO_4$), magnesium sulfate heptahydrate ($MgSO_4 (7H_2O)$), magnesium chloride ($MgCl_2$), potassium magnesium sulfate ($K_2SO_4(2MgSO_4)$), dolomite (providing calcium magnesium carbonate $CaMg(CO_3)_2$), and mixtures thereof (see, e.g., Resh at Table 3.2 and Table 3.1).

A "sulfur source" or "sulfur carrier" is a substance that, optionally through catabolism, can supply a plant with sulfur, preferably in the form of sulfate ($SO_4^{-2}$) or sulfur dioxide gas. Sources of sulfur are well known by the art and include, for example, sulfuric acid ($H_2SO_4$), ammonium sulfate (($NH_4)2SO_4$), ammonium thiosulfate (($NH_4)^2S_2O_3$), potassium sulfate ($K_2SO_4$), magnesium sulfate ($MgSO_4$), magnesium sulfate heptahydrate ($MgSO_4 (7H_2O)$), calcium sulfate ($CaSO(2H_2O)$), monoammonium phosphate (MPA or $NH_4H_2PO_4$), single superphosphate, triple superphosphate, sulfur-coated urea, potassium magnesium sulfate ($K_2SO_4(2MgSO_4)$)), gypsum (providing calcium sulfate ($CaSO(2H_2O)$)), magnesium sulfate (epsom salt), and mixtures thereof (see, e.g., Resh at Table 3.2 and Table 3.1; U.S. Pat. No. 4,210,437).

A "zinc source" or "zinc carrier" is a. substance that, optionally through catabolism, can supply a plant with zinc, preferably in the form of $Zn^{2+}$. Sources of zinc are well known by the art and include, for example, zinc sulfate ($ZnSO_4(7H_2O)$), zinc chloride ($ZnCl_2$), zinc chelate (e.g., ZnEDTA), zinc oxide (ZnO), zinc acetate ($Zn(O_2CCH_3)_2$), and mixtures thereof (see, e.g., Resh at Table 3.2 and Table 3.1; U.S. Pat. No. 3,854,923).

A "copper source" or "copper carrier" is a substance that, optionally through catabolism, can supply a plant with copper, preferably in the form of $Cu^{2+}$. Sources of copper are well known by the art and include, for example, copper chelate (CuEDTA), cuprous oxide ($Cu_2O$), cupric oxide (CuO), cuprous phosphate ($Cu_3P$), cuprous carbonate ($Cu_2CO_3$), cupric phosphate ($Cu_3O_8P_2$), cupric carbonate ($CuCO_3$), cupric sulfate ($CuSO_4$), cuprous sulfate ($Cu_2SO_4$), and mixtures thereof (see, e.g., Resh at Table 3.2 and Table 3.1; U.S. Pat. No. 3,373,009).

An "iron source" or "iron carrier" is a substance that, optionally through catabolism, can supply a plant with iron, preferably in the form of ferrous iron (Fe2+) or ferric iron ($Fe^{3+}$). Sources of iron are well known by the art and include, for example, iron chelates (e.g., FeEDTA), ferric citrate ($C_6H_5FeO_7$), ferric chloride ($FeCl_2(6H_2O)$), ferrous sulfate ($FeSO_4$), ferrous sulfate heptahydrate ($FeSO_4(7H_2O)$), and mixtures thereof (see, e.g., Resh at Table 3.2 and Table 3.1; U.S. Pat. No. 3,753,675).

A "manganese source" or "manganese carrier" is a substance that, optionally through catabolism, can supply a plant with manganese, preferably in the form of $Mn^{2+}$. Sources of manganese are well known by the art and include, for example, manganese sulfate ($MnSO_4(4H_2O)$), manganese chloride ($MnCl_2(4H_2O)$), manganese chelate (e.g., MnEDTA), manganese oxide (MnO), manganese acetate ($Mn(CH_3COO)_2$), manganese nitrate ($Mn(NO_3)_2$), manganese phosphate ($Mn_3(PO_4)_2$), and mixtures thereof (see, e.g., Resh at Table 3.2 and Table 3.1; U.S. Pat. No. 5,797,976).

A "boron source" or "boron carrier" is a substance that, optionally through catabolism, can supply a plant with boron, preferably in the form of boric acid ($H_3BO_3$) or borate ($H_2BO^{3-}$). Sources of boron are well known by the art and include, for example, sodium borate (borax or $BNa_3O_3$), boron phosphate ($BPO_4$), calcium borate ($Ca_3(BO_3)_2$), potassium borohydrate ($KBH_4$), boron trioxide ($B_2O_3$), potassium borotartrate ($C_4H_6B_2K_2O_{10}$), potassium tetraborate ($K_2B_4O_7(4H_2O)$), sodium borohydride sodium tetrahorate ($Na_2B_4O_7(10H_2O)$), and mixtures thereof (see, e.g., Resh at Table 3.2 and Table 3.1; U.S. Pat. Nos. 3,655,357; 6,874,277).

A "molybdenum source" or "molybdenum carrier" is a substance that, optionally through catabolism, can supply a plant with molybdenum, preferably in the form of molybdate ($MoO_4^{2-}$). Sources of molybdenum are well known by the art and include, for example, ammonium molybdate (($NH_4)_6Mo_7O_{24}$), sodium molybdate ($Na_6Mo_7O_{24}$), molybdenum trioxide ($MoO_3$), molybdic acid ($H_2MoO_4$), calcium molybdate ($CaMoO_4$), potassium molybdate ($K_2MoO_4$), and mixtures thereof (see, e.g., Resh at Table 3.2 and Table 3.1; U.S. Pat. No. 6,309,440; U.S. Pre-grant publication No. 2013/0219979).

A "chlorine source" or "chlorine carrier" is a substance that, optionally through catabolism, can supply a plant with chlorine. Sources of chlorine are well known by the art and include, for example, potassium chloride (KCL), calcium chloride ($CaCl_2(6H_2O)$), manganese chloride ($MnCl_2(4H_2O)$), ferric chloride ($FeCl_2(6H_2O)$), cobaltous chloride (CoCl2), magnesium chloride ($MgCl_2$), and mixtures thereof (see, e.g., Resh at Table 3.2 and Table 3.1; U.S. Pat. No. 6,874,277).

A "nickel source" or "nickel carrier" is a substance that, optionally through catabolism, can supply a plant with nickel, preferably in the form of $Ni^{2+}$. Sources of nickel are well known by the art and include, for example, nickel lignosulfonate, nickel gluconate, nickel sulfamate tetrahydrate, nickel acetate tetrahydrate, anhydrous nickel salts, hydrated nickel sulfate ($NiSO_4(6H_2O)$), hydrated nickel nitrate ($Ni(NO_3)_2(6H_2O)$), hydrated nickel chloride ($H_{12}Cl_2NiO_6$), and mixtures thereof (U.S. Pre-grant publication No. 2005/0245397).

An "iodine source" or "iodine carrier" is a substance that, optionally through catabolism, can supply a plant with iodine. Sources of iodine are well known by the art and include, for example, potassium iodide (KI), sodium iodide (NaI), calcium iodide ($CaI_2$), magnesium iodide ($MgI_2$), manganese iodide ($MnI_2$), and mixtures thereof (see, e.g, U.S. Pat. No. 4,699,644).

A "cobalt source" or "cobalt carrier" is a substance that, optionally through catabolism, can supply a plant with cobalt. Sources of cobalt are well known by the art and include, for example, cobaltous chloride ($CoCl_2$), cobalt carbonate ($CoCO_3$), cobalt sulfate ($CoSO_4$), cobalt lactate, cobalt acetate, cobalt nitrate ($Co(NO_3)_2$), and mixtures thereof (see, e.g, U.S. Pat. No. 3,900,572).

Fractions of elements within a compound as well as conversion factors for determining how much of a particular mineral nutrient, for example, is being supplied is known by the art (see, e.g., Resh at Chapters 2 and 3 and Table 2.1; Midwest Laboratories). Further, the atomic and molecular weights, solubility, impurity, substitutions, and other characteristics of elements and compounds are known sufficient for constructing a, for example, feed formulation that supplies a plant with its nutritionally required mineral nutrient(s) (see, e.g., Resh at Chapters 2 and 3 and Table 2.1; Midwest Laboratories). Further modifications to a, for example, feed formulation to accommodate differing plant species, plant growth stages, plant part and conditions (including weather, light intensity, season) to which or during which a feed formulation is applied are also known by the art (Resh at Chapters 2 and 3 and Table 2.1; Midwest Laboratories). In certain embodiments, it may be specified that a feed formulation provides mineral nutrients sufficient to result in a plant having a concentration in dry tissue of about 1.5% nitrogen, 1.0% potassium, 0.5% calcium, 0.2% magnesium, 0.2% phosphorus, 0.1% sulfur, 0.01% chlorine, 0.002% boron, 0.01% iron, 0.005% manganese, 0.002% zinc, 0.0006% copper, and 0.00001% molybdenum (Rosh at Table 2.1). It may be further specified that the foliar feed formulation comprises between about 3.0 to 9.0 g/l citrulline; 0.25 to 0.75 g/l ascorbic acid; 0.25 to 0.75 g/l potassium chloride; 0.08 to 0.25 monopotassium phosphate; 0.40×10-3 to 1.3×10-3 g/l potassium iodide; 0.12 to 0.40 g/l potassium hydroxide; 0.4 to 1.6 g/l calcium chloride; 0.008 to 0.026 g/l magnesium sulfate heptahydrate; 0.40×10-2 to 0.13×10-2 g/l zinc sulfate; 0.12×10-4 to $0.25 \times 10^{-4}$ g/l cupric sulfate; 0.005 to 0.015 g/l ferric citrate; 0.008 to 0.03 g/l manganese sulfate; $0.30 \times 10^{-2}$ to $0.95 \times 10^{-2}$ g/l boric acid; $0.12 \times 10^{-3}$ to $0.40 \times 10^{-3}$ g/l sodium molybdate; $0.12 \times 10^{-4}$ to $0.25 \times 10^{-4}$ g/l cobaltous chloride; 1.5 to 4.5 g/l nickel sulfate; 0.05 to 0.15 g/l myoinositol; 5 to 20 g/l DMSO or SLES; 0.05 to 0.15 g/l thiamin; and 0.01 to 0.06 g/l EDTA disodium dihydrate. It may be further specified that the foliar feed formulation comprises between about 3.0 to 9.0 g/l citrulline; 0.25 to 0.75 g/l ascorbic acid; 0.25 to 0.75 g/l potassium chloride; 0.08 to 0.25 monopotassium phosphate; $0.40 \times 10^{-3}$ to $1.3 \times 10^{-3}$ g/l potassium iodide; 0.12 to 0.40 g/l potassium hydroxide; 0.4 to 1.6 g/l calcium chloride; 0.008 to 0.026 g/l magnesium sulfate heptahydrate; $0.40 \times 10^{-2}$ to $0.13 \times 10^{-2}$ g/l zinc sulfate; $0.12 \times 10^{-4}$ to $0.25 \times 10^{-4}$ g/l cupric sulfate; 0.005 to 0.015 g/l ferric citrate; 0.008 to 0.03 g/l manganese sulfate; $0.30 \times 10^{-2}$ to $0.95 \times 10^{-2}$ g/l boric acid; $0.12 \times 10^{-3}$ to $0.40 \times 10^{-3}$ g/l sodium molybdate; $0.12 \times 10^{-4}$ to $0.25 \times 10^{-4}$ g/l cobaltous chloride; 1.5 to 4.5 g/l nickel sulfate; 0.05 to 0.15 g/l myoinositol; 0.10 to 20 g/l DMSO; 0.10 to 20 g/l of SLES; 0.05 to 0.15 g/l thiamin; and 0.01 to 0.06 g/l EDTA disodium dihydrate.

A source of one nutrient may also be the source of one or more other nutrient. In certain embodiments, for example, the magnesium source and the sulfur source of the feed formulation is magnesium sulfate heptahydrate (epsom salt). Likewise, a source of one nutrient may also serve the same function as an additive. In certain embodiments, for example, cupric sulfate is a source of iron and sulfur and also functions as a fungicide. A person with ordinary skill in the art recognizes whether a source of one nutrient may also be the source of one or more other nutrient, alternatively, such a person may determine the same using known techniques.
PLANT DEFINITIONS A "leafy vegetable plant," "leafy green plan," "leafy vegetable," "leafy herb," "leafy crop," leafy green vegetable," "leafy crop plant," "leafy crop vegetable," "leafy green," or "leafy green vegetable" are used interchangeably herein to refer to a plant that produces edible foliage (e.g., edible green leaves). Leafy vegetable plants are known to the art and preferably include a plant that is a/an: Amaranthus, Eruca, Beta, Vernonia, Brassica, Hypochaeris, Apium, Lactuca, Basella, Cnidoscolus, Stellaria, Cichorium, Malva, Chrysanthemum, Valerianella, Lepidium, Taraxacum, Chenopodium, Pteridium, Athyrium, Telfairia, Inula, Plantago, Andansonia, Talinum, Barbarea, Houttuynia, Corchorus, Sinapis, Tetragonia, Atriplex, Acmella, Pisum, Phytolacca, Crithmum, Crambe, Portutaca, Nasturtium, Ipomoea, Claytonia, Achillea, Capparis, Cirsium, Coriandrum, Diplazium, Foeniculum, Hydrophyllum, Levisticum, Metteuccia, Mentha, Mimulus, Myrrhis, Nymphaea, Ocimum, Onoclea, Pastinaca, Petroselinum, Phaseolus, Ipomoea, Primula, Psoralea, Raphanus, Spinacia, Taraxacum, Thymus, Trifolium, Origanum, Rosinarinus, Salvia, Anethium, Cichorium, Amaryllidaceae, or Melissa plant. Further preferably, a leafy vegetable plant is a/an Lactuca, Beta, Brassica, Spinacia, Eruca, Nasturtium, Mentha, Thymus, Petroselinum, Rosemarinus, Cichoriurn, Amaryllidaceae, Ocimum, Origanum Anethum, Coriandrum, or plant which includes plants having the common names of lettuce, chard, kale and cabbage, spinach, arugula, watercress, mint, thyme, parsley, rosemary, endive, chive, basil, oregano and marjoram, dill, and cilantro, respectively. More preferably, a leafy vegetable plant is a/an Lactuca, Beta, Brassica, Spinacia, Eruca, or Nasturtium plant. Most preferably, a leafy vegetable plant is a Lactuca sativa, Beta vulgaris, Brassica napes, Brassica oleracea, Brassica rapa, Spinaciaoleracea, Eruca sativa, or Nasturtium officinale plant (see, e.g., U.S. Pre-grant Publication No. 2014/0234503; U.S. Pre-grant Publication No. 2006/0194698).

The term "plant" encompasses a whole plant and parts thereof, unless specifically stated otherwise. Plant parts include, but are not limited to, a microspore, pollen, ovary, ovule, flower, stalk, leaf, head, shoot, shoot tip, seed, embryo, embryo sac, cutting, root, root tip, pistil, anther, cotyledon, hypocotyl, meristematic cell, stem, cell, protoplast, meristem, fruit, petiole (leaf stalk), bud, and subparts thereof such as a part of a leaf. Unless specifically stated otherwise, the term "plant" also encompasses all stages of development. For example, "plant" encompasses a seedling. In certain embodiments, the stage of plant development is specified (e.g., mature stage or "maturity"). A person with skill in the art knows the growth and development stages of a reference plant and recognizes that the stages (e.g., the time at which they are reached, the duration thereof, and the labels/names used to refer to the different stages) depends upon the type of plant being discussed. A region or section of a plant or plant part may be referred to using known anatomy terminology including, for example, adaxial (dorsal, upper, or top) and abaxial (ventral, lower or bottom).

The term "foliage" refers to all of the leaves of a vascular plant. In some embodiments, therefore, "foliage" may be used to refer to one leaf. When a plant comprises more than one leaf (i.e., "leaves"), the foliage of that plant comprises all of the plant's leaves.

The term "foliar" or "foliarly" means by way of the foliage or optimized for foliar application. "Foliar feeding" therefore refers to feeding by way of plant foliage. A "foliar feed formulation" is therefore a feed formulation optimized for application to the foliage of a plant and for the uptake of, for example, mineral nutrients through the foliage of the plant. As used herein, however, optimization for foliar application does not exclude suitability for non-foliar application. For example, a foliar feed formulation that has been optimized for foliar application onto a plant may, in certain embodiments, be applied to a plant seed and supply that plant seed with its nutritionally required mineral nutrients. In this way, such a feed formulation is both a seed starter (seed feed formulation) and a foliar feed formulation.

The term "shoot" refers to all of the leaves, flowers, and stems of a vascular plant, collectively. It is recognized by the art that an immature stem tip may also be referred to as a "shoot". The term "bud" or its art-recognized equivalents will be used herein to refer to, for example, an immature stein tip.

The term "roots" refers to the non-shoot parts of a plant. As used herein, "roots" refers to all of the roots of a plant, collectively, and may therefore refer to one root (if the referenced plant only comprises one root) or more than one root. The phrase "a root" means one or more root of a plant.

A plant or a part thereof may be wild type or genetically modified ("transgenic" or "recombinant"). Transgenic plants are plants of which a heterologous gene has been stably integrated into its genome. The expression "heterologous gene" essentially means a gene which is provided or assembled outside the plant and When introduced in the nuclear, chloroplast or mitothondrial genome gives the transformed plant new or improved agronomic or other properties by expressing a protein or polypeptide of interest or by downregulating or silencing other gene(s) which are present in the plant. (see, e.g., U.S. Pre-grant Publication No. 2014/0366441) A plant or plant part of the present invention may be genetically modified for, for example, disease resistance, insect resistance, and/or desirable ornamental characteristics (e.g., leaf or flower color) using known transgenes and known techniques (see, e.g., U.S. Pat. No. 8,404,936).

The color of a plant or plant part may be described with reference to the Royal Horticultural Society of England (RHS) Colour Chart (6$^{th}$ Edition).

"Foliarly applied" refers to applying a substance to the foliage of a plant. Foliar application of substances to a plant is known in the art (see, e.g., Fageria at 1045, 1049-1050, 1052; U.S. Pat. Nos. 6,241,795; 6,328,780; 5,797,976; 4,749,402; 6,874,277; U.S. Pre-grant Publication No. 2013/0130896). Means for applying a substance, a foliar teed formulation for example, onto a plant include manual and automatic spray dispensers (e.g., a spray bottle or a hose); fog or mist machines; droplet dispensers; watering cans (jugs); spreading utensils (e.g., a spatula or a brush); pitching machines that may throw solid, liquid, gelatin, or powder substances; and absorbent articles comprising natural or synthetic material(s) that may hold (absorb) a foliar feed formulation, for example, and be fastened to, for example, plant foliage (e.g., cloth, string, moss, felt, tape, sponge, or foam) (see, e.g., U.S. Pat. No. 5,598,104).

"Foliar feeding" or "foliarly fed" refers to supplying a plant with the plant's nutritionally required mineral nutrients via application of, for example, a foliar feed formulation to the plant's foliage. The amount and rate at which a, for example, foliar feed formulation, must be applied to supply a plant with the majority of its nutritionally required mineral nutrients is known by the art and otherwise easily determined using routine experimentation and known techniques (see, e.g., McGinnis; Hosier; McCauley; Kalra; Muñoz-Huerta; Tezotto; Resh pages 34-118; Fageria et al. 1045, 1049-1050, 1052). "Foliar feeding" and "foliarly fed" as used herein are distinct from "root-feeding" or "root fed," the latter terms referring to supplying a plant with the plant's nutritionally required mineral nutrients through the roots of the plant (also terrestrial growth, soil growth, or soil-based feeding). "Foliar feeding" and "fed" as used herein are distinct from "foliar supplementing" or "foliarly supplemented." A "supplement," or the act of "supplementing," provides only 50% or less of a plant's nutritionally required mineral nutrient(s) to the plant, See, e,g., Fageria; EPO Pat. No. EP0013307 91; U.S. Pre-grant Publication No. 2013/0130896; U.S. Pat. No. 6,241,795; WIPO Publication No. WO2011103617; U.S. Pat. No. 6,328,780; EPO Publication No. EP0114960 A2; U.S. Pat. Nos. 5,797,976; 4,749,402; 6,874,277.

"Yield" as in "plant yield" refers to an increase or decrease in plant vigor; tolerance or resistance to biotic and/or abiotic stress; plant or plant part weight; biomass; number of flowers per plant; number of leaves per plant; grain and/or fruit number; number of tillers or side shoots; leaf width; leaf length; stem length; stem width; number of roots; length of roots; width of roots; protein content, oil content, starch content, pigment content, chlorophyll content of a plant or plant part; and combinations thereof. Preferably, "yield" refers to plant or plant part weight, the number of leaves per plant, the leaf width, the leaf length, stem length, petiole length; stem width; number of roots; length of roots; width of roots, and combinations thereof. Preferably, "yield" refers to the number of leaves, the length of the longest leaf, the width of the longest leaf, and the length of the petiole (stalk) of the longest leaf, Preferably, "yield" refers to one or more of plant or plant part weight, the number of leaves per plant, the leaf width, the leaf length, stem length, petiole length; stem width; number of roots; length of roots; width of roots, plant height, and combinations thereof. Preferably, "yield" refers to the number of leaves, the length of the longest leaf, the width of the longest leaf, the length of the petiole (stalk) of the longest leaf, and plant height. Yield may be determined experimentally by known techniques (U.S. Pat. No. 8,669,421; U.S. Pre-grant Publication No. 2013/0172185; U.S. Pat. No. 7,098,170).

The publications and patents cited herein are incorporated by reference in their entireties.

DETAILED DESCRIPTIONS

The present invention provides a hydroponic system that feeds a leafy vegetable plant through its foliage using a formulation optimized for application to, and mineral nutrient absorption through, the plant's foliage. The feed formulation of the present invention provides a plant with its nutritionally required mineral nutrients and in this way, permits the roots of the plant to be in contact with only an incomplete water solution Wherein that incomplete water solution provides just hydrogen and oxygen to the plant. In this way, root-supplied mineral nutrients may be limited to hydrogen and oxygen. Because an incomplete water solution is a less favorable environment for algae growth, the present invention provides a hydroponic system having less algal growth and, therefore, requiring less monitoring and treatment to identify or prevent algae growth (as compared to traditional hydroponic systems). Having been optimized for foliar application to (foliar feeding of) the plant, the feed formulation of the present invention provides to a plant its nutritionally required mineral macronutrients and micronutrients. In this way, the feed formulation of the present invention overcomes the limitations of foliar nutrient supplementation (see, e.g., Fageria). Because of these properties, the present invention does not require the complex and expensive infrastructure, monitoring, and/or maintenance that others' hydroponic systems do. In particular, for example, the present invention does not require the assaying of a root-applied mineral nutrient solution for ion composition or the supplementing (renewing) of any essential nutrients within a mineral nutrient solution. The present invention also does not require the tools and knowledgeable persons for performing such assays or supplementation. The foliar feed formulation described herein has a consistent, known composition. Methods of nourishing a leafy vegetable plant through its foliage and leafy vegetable plants grown according to the present hydroponic system are also provided, which likewise provide the above advantages.

The present invention provides a method of nourishing a leafy vegetable plant through its foliage by applying a presently described feed formulation to a seed, a leaf grown therefrom, or the foliage of a plant. In certain embodiments, the feed formulation is applied at least once every twenty four hours. In certain embodiments, the feed formulation is applied at least once every twenty four hours until the plant reaches maturity. In certain embodiments, the feed formulation is applied when the stomata are open (Fageria at 1054-1059). In certain embodiments, the feed formulation is applied when the temperature is below that which will burn plant foliage (e.g., applied when the temperature is between about 65° F. and 86° F.) (Midwest Laboratories at 3-4; Fageria at 1054-1059). In certain embodiments, the feed formulation is applied when the plant is not in water stress (too wet or too dry), specifically, the feed formulation is applied when the plant is cool and filled with water (Fageria at 1054-1059). More specifically, the feed formulation is applied when the atmosphere surrounding the plant is greater than 70% relative humidity (Midwest Laboratories at 3-4; Fageria at 1054-1059). In certain embodiments, the feed formulation is applied when wind speeds surrounding the plant are low (e.g., less than 5 miles per hour (mph)) (Midwest Laboratories at 3-4; Fageria at 1054-1059).

In certain embodiments, the leafy vegetable plant of the present invention comprises a transgene stably integrated into its nuclear genome that confers onto the plant disease resistance, insect resistance, and/or a desirable ornamental trait.

In certain embodiments, the yield of a leafy vegetable plant produced by the methods of the present invention comprises between about 80% and 115% of the yield of a plant produced by root-feeding. In certain embodiments, the leafy vegetable plant produced by the methods of the present invention comprises a 1- or 1.5-fold increase in yield as compared to a root-fed plant of the same variety.

The present invention further provides a hydroponics system that is a freshwaterponics or riverponics system for feeding a leafy vegetable plant through its foliage comprising a means for applying the presently described foliar feed formulation to a leafy vegetable plant seed (or a leaf grown therefrom or a leaf of a leafy vegetable plant) and a means for contacting the roots of the plant with an incomplete water solution. In certain embodiments, the means for contacting the roots of the plant with an incomplete water solution is the body of freshwater or river water itself and a raft in contact with the body of freshwater or river water. In this embodiment, the means for applying the feed formulation may be a spray bottle and the feed formulation may be applied at least once a day every twenty four hours until the plant reaches maturity. In this way, the hydroponic system presently described is inexpensive because it requires little infrastructure and little maintenance as compared to traditional hydroponic systems. Further, the hydroponic system presently described is easy to use because it requires little or no monitoring and little maintenance as compared to traditional hydroponic systems. With these benefits, the presently described methods and hydroponic system, using the presently described feed formulation, increase access in rural and urban areas to affordable, locally grown, leafy greens that are suitable for consumption by a variety of animals including humans.

The foliar teed hydroponic system presently described requires less infrastructure, maintenance, and know-how as compared to traditional hydroponic systems. For at least these reasons, the present system and formulation may be used to increase access to affordable, locally grown, leafy greens that are suitable for consumption by a variety of animals including humans. In particular and for example, the presently described foliar feed hydroponic system may be utilized to satisfy the continued push for urban agriculture (growing plants in urban environments including the repurposing of commercial buildings for hydroponic farming). The present system may be utilized to nourish vertically stacked plants, for example, and do so with less infrastructure and maintenance burdens than could a traditional hydroponic system.

EXAMPLES

Many modifications and variations of the present invention are possible in light of the above teachings. It is therefore to be understood that, within the scope of the appended claims, a person with skill in the art would recognize that the invention may be practiced otherwise than as specifically described. The illustrative embodiments and examples should not be construed as limiting the invention.

Example 1: Feed Formulation for Foliar Application

A powder comprising the substances as listed within Table 1A (in grams g)) was added to one liter (l) of water to produce a feed formulation of the invention, having a final pH of 5.6.

TABLE 1A

| Substance | Grams (g) |
| --- | --- |
| Thiamin | 0.10 |
| Ascorbic acid | 0.50 |
| Citrulline | 6.00 |
| Myoinositol | 0.10 |
| Potassium chloride | 0.50 |
| Calcium chloride | 0.80 |
| Magnesium sulfate heptahydrate | 0.37 |
| Monopotassium phosphate | 0.17 |
| Manganese sulfate | 0.017 |
| Ferric citrate | 0.01 |
| Zinc sulfate | 0.0086 |
| Boric acid | 0.0062 |
| Potassium iodide | 0.00083 |
| Sodium molybdate | 0.00025 |
| Cupric sulfate | 0.000025 |
| Cobaltous chloride | 0.000025 |
| EDTA disodium dehydrate | 0.373 |
| Potassium hydroxide | 0.25 |
| DMSO | 10 |
| SLES | 10 |
| Nickel sulfate | 3.0 |
| TOTAL | 32.206 |

Example 2: Another Feed Formulation for Foliar Application

A powder comprising the substances as listed within Table 1B (in grams (g)) is added to one liter (l) of water to produce a feed formulation of the invention having a final pH of 5.6

TABLE 1B

| Substance | Grams (g) |
| --- | --- |
| Thiamin | 0.10 |
| Ascorbic acid | 0.50 |
| Citrulline | 6.00 |
| Myoinositol | 0.10 |
| Potassium chloride | 0.50 |
| Calcium chloride | 0.80 |
| Magnesium sulfate heptahydrate | 0.37 |
| Monopotassium phosphate | 0.17 |
| Manganese sulfate | 0.017 |
| Ferric citrate | 0.01 |
| Zinc sulfate | 0.0086 |
| Boric acid | 0.0062 |
| Potassium iodide | 0.00083 |
| Sodium molybdate | 0.00025 |
| Cupric sulfate | 0.000025 |
| Cobaltous chloride | 0.000025 |
| EDTA disodium dehydrate | 0.373 |
| Potassium hydroxide | 0.25 |
| DMSO | 20 |
| SLES | 20 |
| Nickel sulfate | 3.0 |
| TOTAL | 52.206 |

Example 3: Hydroponic Growth of a Leafy Vegetable Plant Utilizing the Foliar Feed Formulation of Example 1 Compared to the Growth of a Leafy Vegetable Plant Utilizing a Traditional, Root-Fed Hydroponic System Forty Lactuca sativa seeds were divided, one each, into net cups having perforations within their bottoms sufficient for plant roots to pass through (hereinafter cup(s)). The forty cups were further divided into four groups, ten cups each. The four groups were each assayed for a different yield characteristic. Five plants within each group were control plants and the remaining five plants within each group were experimental plants. But-for the differences detailed below, control and experimental plants were grown in comparable conditions.

Each of the twenty experimental plant cups were attached to a raft wherein the raft was in contact with river water. Once daily for six weeks, about 9 ml of the feed formulation was applied to all twenty experimental seeds and to the foliage of the plants growth therefrom. As they grew, the roots of the experimental plants passed through the perforations within the cups toward the river water and, when long enough, were in contact with river water. Between about 80% and 100% of the surface area of full grown roots were in contact with river water. Likewise, between about 80% and 100% of the length of full grown roots were in contact with river water.

The feed formulation comprises a full complement of a leafy vegetable plant's nutritionally required mineral nutrients, a sufficient amount of a penetrant, and additives. The river water was essentially free of mineral nutrients and therefore comprised an incomplete water solution having less than a full complement of a leafy vegetable plant's nutritionally required mineral nutrients. The river water had a pH of about 5.1.

Each of the twenty control plant cups were suspended in receptacle comprising the FLORANOVA® Grow (General Hydroponics, Inc. Sebastopol, California USA) hydroponic solution (see generalhydroponics.com) such that the control seeds were continuously in contact with the hydroponic solution according to the commercial use instructions. The cups were suspended in the receptacle in such a way that, as they grew, the roots of the control plants passed through the perforations within the cups toward the hydroponic solution were in contact with hydroponic solution. For six weeks, the control seeds and plant roots grown therefrom were in continuous, substantial contact with the commercial hydroponic solution according to the commercial use instructions.

The FLORANOVA® Grow (General Hydroponics, Inc. Sebastopol, California USA) hydroponics solution is particularly formulated for the hydroponic growth of a leafy vegetable plant and comprises a full complement of its nutritionally required mineral nutrients.

On the first day of the third, fourth, fifth, and sixth week of growth, the four groups were assayed for one of the following yield characteristics: number of leaves (Table 2), length of the longest leaf (Table 3), width of the longest leaf (Table 4). and the length of the petiole of the longest leaf (Table 5). The results, in centimeters (cm) were as presented in Tables 2-5.

TABLE 2

Number of leaves

| | Week 3 | | Week 4 | | Week 5 | | Week 6 | |
|---|---|---|---|---|---|---|---|---|
| | Control | Formula | Control | Formula | Control | Formula | Control | Formula |
| Cup 1 | 7 | 5 | 9 | 7 | 13 | 10 | 15 | 12 |
| Cup 2 | 4 | 4 | 5 | 7 | 9 | 11 | 14 | 12 |
| Cup 3 | 3 | 4 | 8 | 6 | 14 | 12 | 18 | 15 |
| Cup 4 | 7 | 6 | 9 | 9 | 8 | 10 | 12 | 14 |
| Cup 5 | 3 | 4 | 8 | 7 | 12 | 12 | 15 | 16 |
| Average | 4.8 | 4.6 | 7.8 | 7.2 | 11.2 | 11 | 14.8 | 13.8 |
| Standard Deviation | 1.8 | 0.8 | 1.5 | 0.98 | 2.3 | 0.89 | 1.9 | 1.6 |

TABLE 3

Length of longest leaf (cm)

| | Week 3 | | Week 4 | | Week 5 | | Week 6 | |
|---|---|---|---|---|---|---|---|---|
| | Control | Formula | Control | Formula | Control | Formula | Control | Formula |
| Cup 1 | 17 | 14 | 19 | 17 | 23 | 21 | 26 | 24 |
| Cup 2 | 15 | 14 | 18 | 17 | 21 | 20 | 24 | 23 |
| Cup 3 | 14 | 15 | 17 | 18 | 19 | 22 | 22 | 26 |
| Cup 4 | 17 | 13 | 19 | 17 | 22 | 19 | 25 | 22 |
| Cup 5 | 16 | 15 | 20 | 19 | 24 | 23 | 27 | 27 |
| Average | 15.8 | 14.2 | 18.6 | 17.6 | 21.8 | 21 | 24.8 | 24.4 |
| Standard Deviation | 1.2 | 0.75 | 1.0 | 0.8 | 1.7 | 1.4 | 1.7 | 1.8 |

TABLE 4

Width of longest leaf (cm)

| | Week 3 | | Week 4 | | Week 5 | | Week 6 | |
|---|---|---|---|---|---|---|---|---|
| | Control | Formula | Control | Formula | Control | Formula | Control | Formula |
| Cup 1 | 12 | 10 | 13 | 13 | 15 | 15 | 21 | 19 |
| Cup 2 | 10 | 11 | 15 | 14 | 17 | 16 | 20 | 21 |
| Cup 3 | 12 | 10 | 14 | 14 | 18 | 17 | 22 | 17 |
| Cup 4 | 10 | 10 | 14 | 15 | 17 | 18 | 21 | 20 |
| Cup 5 | 11 | 9 | 16 | 13 | 19 | 16 | 20 | 19 |
| Average | 11 | 20 | 14.4 | 13.8 | 17.2 | 16.4 | 20.8 | 19.2 |
| Standard Deviation | 0.89 | 0.63 | 1.0 | 0.75 | 1.3 | 1.0 | 0.75 | 1.3 |

TABLE 5

Length of the petiole of the longest leaf (cm)

| | Week 3 | | Week 4 | | Week 5 | | Week 6 | |
|---|---|---|---|---|---|---|---|---|
| | Control | Formula | Control | Formula | Control | Formula | Control | Formula |
| Cup 1 | 23 | 29 | 25 | 32 | 28 | 34 | 31 | 35 |
| Cup 2 | 24 | 32 | 26 | 35 | 29 | 36 | 34 | 38 |
| Cup 3 | 28 | 29 | 30 | 32 | 31 | 34 | 34 | 36 |
| Cup 4 | 26 | 23 | 31 | 26 | 34 | 27 | 36 | 30 |
| Cup 5 | 26 | 23 | 32 | 25 | 35 | 28 | 36 | 29 |
| Average | 25.4 | 27.2 | 28.8 | 30 | 31.4 | 31.8 | 34.2 | 33.6 |
| Standard Deviation | 1.74 | 3.6 | 2.8 | 3.8 | 2.7 | 3.6 | 1.8 | 3.5 |

The data within Tables 2-5 show that experimental plants and control plants had comparable yields. In particular, the number of leaves, length of the longest leaf, width of the longest leaf, and length of the petiole of the longest leaf of the experimental plants was comparable to that of the control plants. Tables 2-5 and FIGS. 1-4 further demonstrate that a leafy vegetable plant having been grown using a herein described hydroponic system and foliar feed formulation grows and develops in a manner that is comparable to a plant of the same type having been grown via traditional, hydroponic techniques wherein the plant absorbs its nutritionally required mineral nutrients through its roots.

Example 4: Climate Controlled Hydroponic Growth of a Leafy Vegetable Plant under High Pressure Sodium Lighting and Utilizing the Foliar Feed Formulation of Example 1 Compared to the Growth of a Leafy Vegetable Plant Utilizing a Traditional, Root-Fed Hydroponic System To show that a plant's mineral nutrient absorption when grown using the foliar feeding formulation of this invention is not substantially limited by precipitation, evaporation, and openness of stomata, a comparison was made of plants grown using the invention's foliar feeding hydroponic system to plants grown in an industry-standard hydroponic system providing optimal water, nutrient, light, oxygen, and health conditions. The comparison was conducted as provided below. Anova statistical analysis and the graphic representations provided at, for example, FIGS. 8-10 confirm the observation that plants grown using the invention's foliar feeding hydroponic system develop (achieve yields) at a rate that is comparable to plants grown in industry-standard hydroponic systems providing optimal water, nutrient, light, oxygen, and health conditions.

A powder comprising the substances as listed within Table 1C (in grams (g)) is added to one liter (l) of water to produce a feed formulation of the invention having a final pH of 5.6.

TABLE 1C

| Substance | Grams (g) |
| --- | --- |
| Thiamin | 0.10 |
| Ascorbic acid | 0.50 |
| Citrulline | 6.00 |
| Myoinositol | 0.10 |
| Potassium chloride | 0.50 |
| Calcium chloride | 0.80 |
| Magnesium sulfate heptahydrate | 0.37 |
| Monopotassium phosphate | 0.17 |
| Manganese sulfate | 0.017 |
| Ferric citrate | 0.01 |
| Zinc sulfate | 0.0086 |
| Boric acid | 0.0062 |
| Potassium iodide | 0.00083 |
| Sodium molybdate | 0.00025 |
| Cupric sulfate | 0.000025 |
| Cobaltous chloride | 0.000025 |
| EDTA disodium dehydrate | 0.373 |
| Potassium hydroxide | 0.25 |
| DMSO | 0.44 |
| SLES | 1.01 |
| Nickel sulfate | 3.0 |
| TOTAL | 13.656 |

Eighty Lactuca saliva seeds were divided, four each, into twenty five-gallon buckets. The twenty buckets were evenly divided into five groups (four buckets per group, labeled 1, 2, 3, 4, and 5, respectively) and each group was placed under one of five 400 watt High Pressure Sodium (HSP) grow lights. Three seeds within each bucket were experimental seeds (labeled A, B, and C, respectively) and one seed within each bucket was a control seed (labeled X). In total, there were sixty experimental plants (referred to as "Formula" in data tables) and twenty control plants (referred to as "Control" in data tables). But-for the differences detailed below, experimental and control seeds were grown in comparable conditions.

Within the buckets, experimental seeds were scatter sown into expanded clay pellet media moistened with an incomplete water solution (well water). Seeds sprouted within one week and seedlings were culled to sixty experimental seeds. Starting at one week of growth and once daily thereafter for four weeks, about 4 ml of the feed formulation as described in Table 1C was applied using a mist sprayer to the experimental seeds and to the adaxial surface of the foliage of the plants growth therefrom.

Within the buckets, control seeds were scatter sown into expanded clay pellet media moistened with FLORANOVA® Grow (General Hydroponics, Inc. Sebastopol, California USA) hydroponic solution (see generalhydroponics.com). Seeds sprouted within one week and seedlings were culled to twenty control seeds. The control seeds and plants grown therefrom were hydroponically root-fed according to the FLORANOVA® Grow (General Hydroponics, Inc. Sebastopol, California USA) label instructions (see FLORANOVA® Grow 7-4-10 One-Part Nutrient product label, GENERAL HYDROPONICS®; available at generalhydyroponics.com). The FLORANOVA® Grow (General Hydroponics, Inc. Sebastopol, California USA) hydroponics solution is particularly formulated for the hydroponic growth of a leafy vegetable plant and comprises a full complement of its nutritionally required mineral nutrients (see FLORANOVA® Grow 7-4-10 One-Part Nutrient product label, GENERAL HYDROPONICS®; available at generalhydyroponics.com).

At weeks 2, 3, and 4 of growth, each of the eighty plants were assayed for three yield characteristics: number of leaves (Tables 6 and 7), length of the longest leaf (Tables 8 and 9), and plant height (Tables 10 and 11). The length of the longest leaf was determined by measuring the base of the leaf to the apex (tip) (i.e, did not include the length of the petiole). The plant height was determined by measuring the base of the stem to the leaf tip (i.e., did include the length of the petiole) and only the largest plant height measurements were recorded. The results, in centimeters (cm) were as presented in Tables 6, 8, and 10. Each of A-C and X comprised four plants, so within the columns labeled "Week 2," "Week 3," and "Week 4" of Tables 6, 8, and 10, the measurements of each of the four plants are provided and separated by a comma (in the order of Plant1, Plant2, Plant3, and Plant4 from left to right, top to bottom throughout the tables). Using the data within Tables 6, 8, and 10, the average experimental (Formula) values (average of 1A-1C, 2A-2C, 3A-3C. 4A-4C, and 5A-5C (Formula "Final Average")) are presented against the average Control values (average of 1D, 2D, 3D, 4D, and 5D (Control "Final Average")) within Tables 7, 9, and 11, respectively, below.

TABLE 6

Number of leaves

|  |  | Week 2 | Week 2 Average | Week 2 Standard Deviation | Week 3 | Week 3 Average | Week 3 Standard Deviation | Week 4 | Week 4 Average | Week 4 Standard Deviation |
|---|---|---|---|---|---|---|---|---|---|---|
| Group 1 | A | 4, 4, 4, 4 | 4.00 | 0 | 6, 5, 4, 4 | 4.75 | 0.96 | 5, 6, 4, 6 | 5.25 | 0.96 |
|  | B | 5, 4, 4, 4 | 4.25 | 0.25 | 6, 6, 5, 6 | 5.75 | 0.50 | 7, 9, 6, 7 | 7.25 | 1.26 |
|  | C | 4, 4, 4, 4 | 4.00 | 0 | 6, 5, 6, 5 | 5.50 | 0.58 | 8, 6, 6, 7 | 6.75 | 0.96 |
|  | X | 4, 4, 4, 4 | 4.00 | 0 | 7, 7, 6, 6 | 6.50 | 0.58 | 9, 6, 9, 6 | 7.50 | 1.73 |
| Group 2 | A | 4, 3, 4, 4 | 3.75 | 0.50 | 6, 5, 5, 5 | 5.25 | 0.50 | 4, 4, 6, 6, | 6.50 | 0.58 |
|  | B | 4, 4, 4, 4 | 4.00 | 0 | 6, 5, 5, 6 | 5.50 | 0.58 | 7, 9, 6, 9 | 7.75 | 1.50 |
|  | C | 4, 4, 4, 4 | 4.00 | 0 | 5, 6, 5, 5 | 5.25 | 0.50 | 8, 8, 6, 7 | 7.25 | 0.96 |
|  | X | 4, 4, 4, 4 | 4.00 | 0 | 6, 7, 7, 6 | 6.50 | 0.58 | 9, 6, 9, 7 | 7.75 | 1.50 |
| Group 3 | A | 4, 4, 4, 4 | 4.00 | 0 | 5, 5, 4, 5 | 4.75 | 0.50 | 6, 5, 5, 5 | 5.25 | 0.50 |
|  | B | 4, 5, 4, 4 | 4.25 | 0.50 | 6, 6, 6, 6 | 4.00 | 0 | 6, 7, 6, 6 | 6.25 | 0.50 |
|  | C | 4, 4, 4, 4 | 4.00 | 0 | 6, 6, 6, 5 | 5.75 | 0.50 | 7, 6, 7, 6 | 6.50 | 0.58 |
|  | X | 4, 4, 4, 4 | 4.00 | 0 | 6, 6, 6, 7 | 6.25 | 0.50 | 7, 9, 6, 8 | 7.50 | 1.29 |
| Group 4 | A | 4, 4, 4, 4 | 4.00 | 0 | 4, 4, 4, 6 | 4.50 | 1.0 | 6, 5, 6, 6 | 5.75 | 0.50 |
|  | B | 4, 4, 4, 4 | 4.00 | 0 | 6, 6, 6, 6 | 6.00 | 0 | 7, 6, 6, 7 | 6.50 | 0.58 |
|  | C | 4, 4, 4, 4 | 4.00 | 0 | 5, 6, 5, 6 | 5.50 | 0.58 | 8, 6, 7, 6 | 6.75 | 0.96 |
|  | X | 4, 4, 4, 4 | 4.00 | 0 | 6, 7, 7, 6 | 6.50 | 0.58 | 8, 6, 7, 7 | 7.00 | 0.82 |
| Group 5 | A | 4, 5, 4, 4 | 4.25 | 0.50 | 4, 4, 4, 6 | 4.50 | 1.0 | 6, 5, 4, 5 | 5.00 | 0.82 |
|  | B | 5, 5, 4, 5 | 4.75 | 0.50 | 5, 6, 5, 6 | 5.50 | 0.58 | 9, 7, 9, 9 | 8.50 | 1.00 |
|  | C | 4, 4, 4, 4 | 4.00 | 0 | 5, 5, 6, 6 | 5.50 | 0.58 | 7, 6, 6, 7 | 6.50 | 0.58 |
|  | X | 4, 4, 4, 4 | 4.00 | 0 | 7, 7, 6, 7 | 6.75 | 0.50 | 6, 8, 8, 9 | 7.75 | 1.26 |

TABLE 7

Average number of leaves

|  | Week 2 Average Control | Week 2 Average Formula | Week 3 Average Control | Week 3 Average Formula | Week 4 Average Control | Week 4 Average Formula |
|---|---|---|---|---|---|---|
| Group 1 | 4.00 | 4.08 | 6.50 | 5.33 | 7.50 | 6.42 |
| Group 2 | 4.00 | 3.92 | 6.50 | 5.33 | 7.75 | 7.17 |
| Group 3 | 4.00 | 4.08 | 6.25 | 4.83 | 7.50 | 6.00 |
| Group 4 | 4.00 | 4.00 | 6.50 | 5.33 | 7.00 | 6.33 |
| Group 5 | 4.00 | 4.33 | 6.75 | 5.17 | 7.75 | 6.67 |
| Final Average | 4.0 | 4.08 | 6.50 | 5.20 | 7.50 | 6.52 |
| Standard Deviation | 0 | 0.14 | 0.16 | 0.19 | 0.27 | 0.39 |

TABLE 8

Length of the longest leaf (cm)

|  |  | Week 2 | Week 2 Average | Week 2 Standard Deviation | Week 3 | Week 3 Average | Week 3 Standard Deviation | Week 4 | Week 4 Average | Week 4 Standard Deviation |
|---|---|---|---|---|---|---|---|---|---|---|
| Group 1 | A | 2.5, 2, 1, 1.5 | 1.75 | 0.65 | 10, 10, 12, 11.5 | 10.88 | 1.03 | 14.5, 15.5, 11, 13 | 13.50 | 1.96 |
|  | B | 1.5, 2, 3, 1.5 | 2.00 | 0.71 | 9, 9, 9.5, 10 | 9.38 | 0.48 | 11, 13, 15, 13 | 13.00 | 1.63 |
|  | C | 3, 2, 3, 2 | 2.50 | 0.58 | 10, 8, 8, 10 | 9.00 | 1.15 | 12, 13, 14, 14 | 13.25 | 0.96 |
|  | X | 3.5, 3.5, 3, 2.5 | 3.13 | 0.48 | 12, 11, 10, 12 | 11.25 | 0.96 | 18, 14, 13, 11 | 14.00 | 2.94 |
| Group 2 | A | 1.5, 1.5, 2, 1.5 | 1.63 | 0.25 | 10.5, 11, 11.5, 10.5 | 10.86 | 0.48 | 15, 15, 11.5, 14.5 | 14.00 | 1.68 |
|  | B | 2, 1.5, 3, 1.5 | 2.00 | 0.71 | 10, 9.5, 9, 9 | 9.38 | 0.48 | 13.5, 13, 12.5, 12 | 12.75 | 0.65 |
|  | C | 2, 3, 3, 2 | 2.50 | 0.58 | 9.5, 8, 9, 8.5 | 8.75 | 0.65 | 12, 12.5, 14, 12.5 | 12.75 | 0.87 |
|  | X | 3.5, 3.5, 3, 3 | 3.25 | 0.29 | 10, 11, 12, 11.5 | 11.13 | 0.85 | 15, 13.5, 17.5, 12.5 | 14.63 | 2.17 |
| Group 3 | A | 2.5, 2, 2, 1.5 | 2.00 | 0.41 | 11, 12, 11, 11.5 | 11.38 | 0.48 | 12, 14, 15, 13.5 | 13.63 | 1.25 |
|  | B | 2, 1.5, 2, 1.5 | 1.75 | 0.29 | 10, 9, 9, 9.5 | 9.38 | 0.48 | 11, 11.5, 14, 13.5 | 12.50 | 1.47 |
|  | C | 3, 2.5, 2, 2 | 2.38 | 0.48 | 8, 9, 8.5, 10 | 8.88 | 0.85 | 13, 13.5, 13.5, 14 | 13.50 | 0.41 |
|  | X | 3.5, 3, 2, 2.5 | 2.75 | 0.65 | 11.5, 10.5, 12, 10.5 | 11.13 | 0.75 | 12.5, 15, 16.5, 14.5 | 14.63 | 1.65 |
| Group 4 | A | 2, 2, 2, 2.5 | 2.13 | 0.25 | 10, 10, 11, 10 | 10.25 | 0.50 | 13.5, 14.5, 12, 14 | 13.5 | 1.08 |
|  | B | 1.5, 2, 2, 2.5 | 2.00 | 0.48 | 9, 9.5, 9.5, 10 | 9.50 | 0.41 | 13, 14.5, 12.5, 14 | 13.50 | 0.91 |
|  | C | 2, 3, 2.5, 3 | 2.63 | 0.48 | 9, 9, 9, 10 | 9.25 | 0.50 | 14, 13.5, 14, 13.5 | 13.75 | 0.29 |
|  | X | 3.5, 3.5, 2.5, 3.5 | 3.25 | 0.50 | 12, 11, 11.5, 10 | 11.13 | 0.85 | 14, 11, 14.5, 12.5 | 13.0 | 1.58 |
| Group 5 | A | 1, 1, 1, 2 | 1.25 | 0.50 | 11, 12, 10, 11 | 11.00 | 0.82 | 14, 12, 13.5, 12 | 12.88 | 1.03 |
|  | B | 2, 3, 1.5, 2.5 | 2.25 | 0.65 | 9, 9, 9.5, 9.5 | 9.25 | 0.29 | 11.5, 14, 13.5, 14 | 13.25 | 1.19 |
|  | C | 3, 2, 2.5, 2.5 | 2.50 | 0.41 | 10, 8, 9, 9.5 | 9.13 | 0.85 | 12.5, 13, 14, 12.5 | 13.0 | 0.71 |
|  | X | 3.5, 3, 3, 3.5 | 3.25 | 0.29 | 11.5, 12, 11, 12 | 11.63 | 0.48 | 13, 13.5, 14, 14.5 | 13.75 | 0.65 |

TABLE 9

Average length of the longest leaf (cm)

|  | Week 2 | | Week 3 | | Week 4 | |
| --- | --- | --- | --- | --- | --- | --- |
|  | Average Control | Average Formula | Average Control | Average Formula | Average Control | Average Formula |
| Group 1 | 3.13 | 2.08 | 11.25 | 9.75 | 14.00 | 13.25 |
| Group 2 | 3.25 | 2.04 | 11.13 | 9.66 | 14.63 | 13.17 |
| Group 3 | 2.75 | 2.04 | 11.13 | 9.88 | 14.63 | 13.21 |
| Group 4 | 3.25 | 2.25 | 11.13 | 9.67 | 13.00 | 13.58 |
| Group 5 | 3.25 | 2.00 | 11.63 | 9.79 | 13.75 | 13.04 |
| Final Average | 3.13 | 2.08 | 11.25 | 9.75 | 14.00 | 13.25 |
| Standard Deviation | 0.22 | 0.10 | 0.22 | 0.09 | 0.68 | 0.20 |

TABLE 10

Plant height (cm)

|  |  | Week 2 | Week 2 Average | Week 2 Standard Deviation | Week 3 | Week 3 Average | Week 3 Deviation | Week 4 | Week 4 Average | Week 4 Standard Deviation |
| --- | --- | --- | --- | --- | --- | --- | --- | --- | --- | --- |
| Group 1 | A | 6, 6.5, 7.5, 7.5 | 6.88 | 0.75 | 18, 16, 19, 18 | 17.75 | 1.26 | 30, 20, 17.5, 17 | 21.13 | 6.06 |
|  | B | 7, 8.5, 5, 4 | 6.13 | 2.02 | 14, 12, 13, 18 | 14.25 | 2.63 | 17, 13, 34, 14 | 19.50 | 9.81 |
|  | C | 8.5, 6, 6, 6.5 | 6.75 | 1.19 | 14, 13, 12, 12 | 12.75 | 0.96 | 22, 23, 24, 35 | 26.00 | 6.06 |
|  | X | 6, 9.5, 10, 10 | 8.88 | 1.93 | 23, 18, 18, 17 | 19.00 | 2.71 | 35, 35, 23, 29 | 30.50 | 5.74 |
| Group 2 | A | 5.5, 9, 7, 7.5 | 7.25 | 1.44 | 17, 16.5, 18, 17.5 | 17.25 | 0.65 | 14, 25.5, 26, 25 | 22.63 | 5.76 |
|  | B | 6.5, 5, 7, 6.5 | 6.25 | 0.87 | 14, 14, 13, 14 | 13.75 | 0.50 | 26.5, 20, 16, 19.5 | 20.50 | 4.38 |
|  | C | 7, 8, 6.5, 6 | 6.88 | 0.85 | 14, 12, 12, 14 | 13.00 | 1.15 | 25, 25.5, 30, 23.5 | 26.00 | 2.80 |
|  | X | 9, 7.5, 10, 7.5 | 8.50 | 1.22 | 18.5, 17.5, 18.5, 20.5 | 18.75 | 1.26 | 24.5, 30, 33.5, 31.5 | 29.88 | 3.86 |
| Group 3 | A | 6.5, 6.5, 6.6, 6 | 6.40 | 0.27 | 16.5, 18, 19, 18.5 | 18.00 | 1.08 | 18, 19.5, 25, 17.5 | 20.00 | 3.44 |
|  | B | 4.5, 5, 6.5, 4.5 | 5.13 | 0.95 | 17, 15, 12.5, 13 | 14.38 | 2.06 | 17, 15, 26, 14.5 | 18.13 | 5.36 |
|  | C | 6.5, 7, 7, 6.5 | 6.75 | 0.29 | 12.5, 13.5, 12, 12.5 | 12.63 | 0.63 | 25, 26.5, 28.5, 29.5 | 27.38 | 2.02 |
|  | X | 9.5, 10, 9, 8.5 | 9.25 | 0.65 | 21, 18.5, 20, 18 | 19.38 | 1.38 | 25, 30, 26.5, 29 | 27.63 | 2.29 |
| Group 4 | A | 7, 7.5, 7, 8 | 7.38 | 0.48 | 17, 18, 19, 18.5 | 18.13 | 0.85 | 24.5, 17, 18, 23.5 | 20.75 | 3.80 |
|  | B | 7, 6.5, 6.5, 7 | 6.75 | 0.29 | 13, 13.5, 17, 16 | 14.88 | 1.93 | 23, 13.5, 23.5, 16.5 | 19.13 | 4.92 |
|  | C | 6, 7.5, 5.5, 6 | 6.25 | 0.87 | 12, 12.5, 14, 12 | 12.63 | 0.95 | 26, 24.5, 29, 24.5 | 26.0 | 2.12 |
|  | X | 9.5, 10, 6.5, 10 | 9.00 | 1.68 | 19, 17, 20, 18 | 18.50 | 1.29 | 23.5, 34.5, 33.5, 34 | 31.38 | 5.27 |
| Group 5 | A | 6, 7.4, 7.5, 5 | 6.48 | 1.20 | 18, 18.5, 16, 18 | 17.63 | 1.11 | 27.5, 20.5, 18.5, 18 | 21.13 | 4.39 |
|  | B | 5.5, 6.5, 6.5, 7 | 6.38 | 0.63 | 14, 16, 12, 14 | 14.0 | 1.63 | 16, 24.5, 15, 25.5 | 20.25 | 5.52 |
|  | C | 5.5, 6, 7, 7.5 | 6.50 | 0.91 | 13.5, 12, 13.5, 12 | 12.75 | 0.87 | 26, 27.5, 24, 21 | 24.63 | 2.81 |
|  | X | 7.5, 8.5, 10, 9 | 8.75 | 1.04 | 20, 21, 18.5, 18 | 19.38 | 1.38 | 32.5, 34, 33.5, 32.5 | 33.13 | 0.75 |

TABLE 11

Average plant height (cm)

|  | Week 2 | | Week 3 | | Week 4 | |
| --- | --- | --- | --- | --- | --- | --- |
|  | Average Control | Average Formula | Average Control | Average Formula | Average Control | Average Formula |
| Group 1 | 8.88 | 6.59 | 19.00 | 14.92 | 30.50 | 22.21 |
| Group 2 | 8.50 | 6.79 | 18.75 | 14.67 | 29.88 | 23.04 |
| Group 3 | 9.25 | 6.09 | 19.38 | 15.00 | 27.63 | 21.84 |
| Group 4 | 9.00 | 6.79 | 18.50 | 15.21 | 31.38 | 21.96 |
| Group 5 | 8.75 | 6.45 | 19.38 | 14.79 | 33.13 | 22.00 |
| Final Average | 8.88 | 6.54 | 19.00 | 14.92 | 30.50 | 22.21 |
| Standard Deviation | 0.28 | 0.29 | 0.39 | 0.18 | 2.02 | 0.48 |

Figure 8:
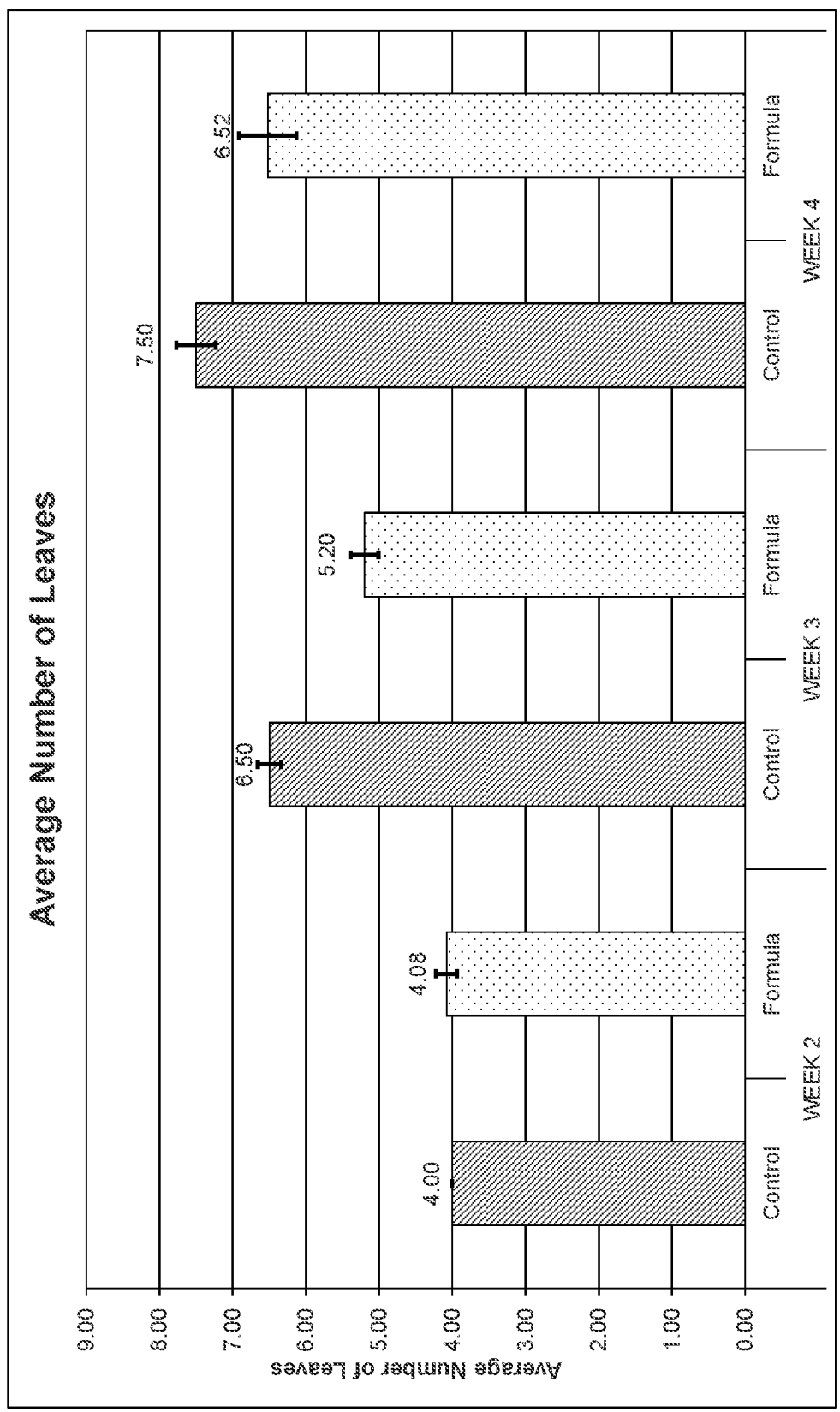
FIG. 8 (hereinafter FIG. 8) depicts the average number of leaves of experimental and control plants when grown as is described within Example 4. The averages and standard deviation values depicted are as provided in Table 7.
Figure 9:
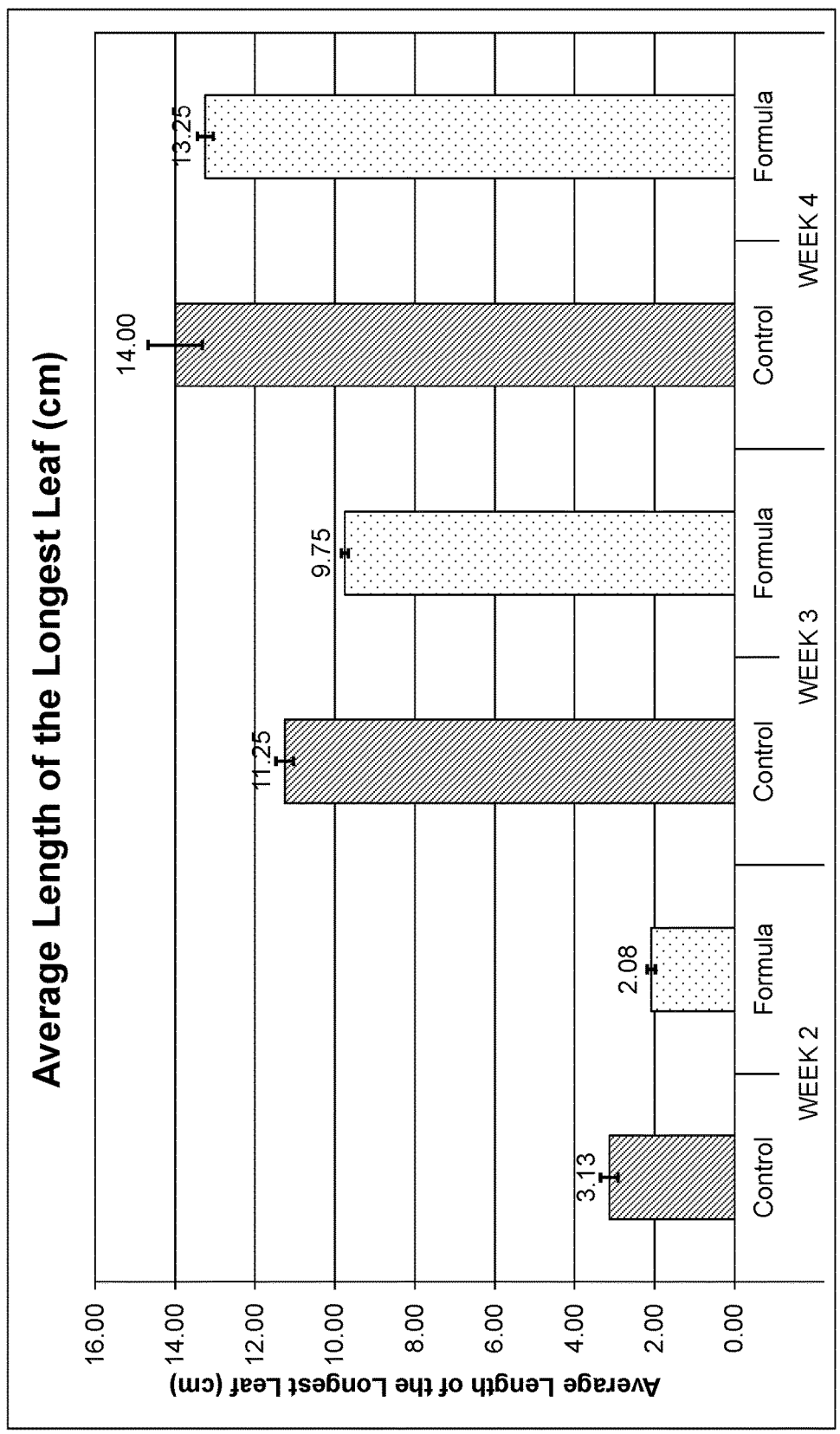
FIG. 9 (hereinafter FIG. 9) depicts the average length of the longest leaf, in centimeters of experimental and control plants when grown as is described within Example 4. The averages and standard deviation values depicted are as provided in Table 9.
Figure 10:
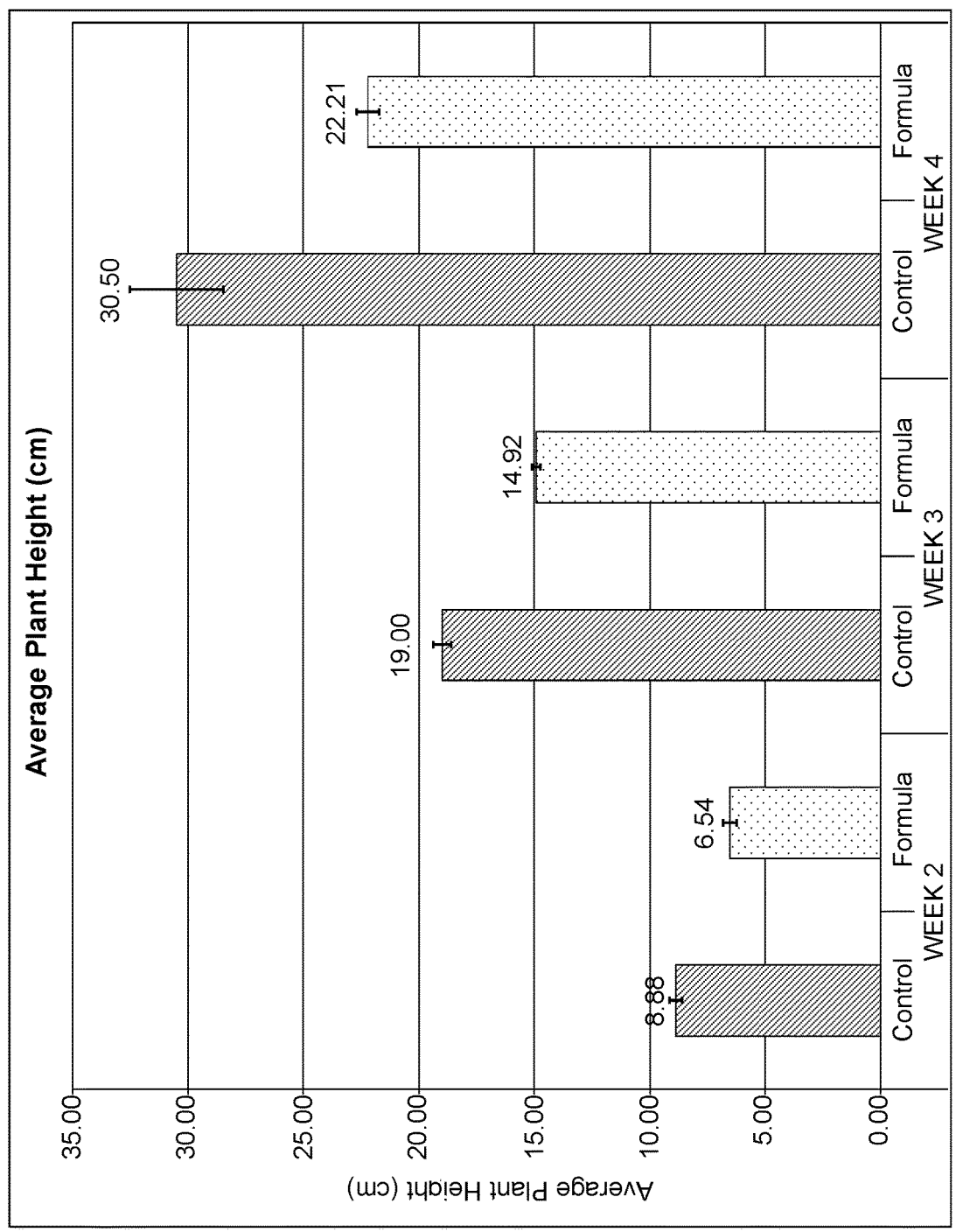
FIG. 10 (hereinafter FIG. 10) depicts the average plant height, in centimeters (cm), of experimental and control plants when grown as is described within Example 4. The averages and standard deviation values depicted are as provided in Table 11.

The data within Tables 6-11 and FIGS. 8-10 show that experimental plants and control plants had comparable yields. In particular, the number of leaves, length of the longest leaf, and plant height of the experimental plants was comparable to that of the control plants. At the end of the experimental period, the number of leaves of Formula plants was 86% that of Control plants, the average length of the longest leaf of Formula plants was 95% that of Control plants, and the average plant height of Formula plants was 73% that of Control plants. This data indicates that experimental plants reached genetic maturity from foliar feeding with the Table 1C formula, which shows that the plant's nutritionally required mineral nutrients were provided by a formula as described in Example 1 and foliar feeding therewith.

In view of the above-described experiments, a person with ordinary skill in the art would recognize that the foliar feed formulations and hydroponic systems of the present invention are easily adaptable to, for example, urban growth systems by applying the foliar feed formulation with alternate techniques, by contacting plant roots with an incomplete water solution using other methods or tools, and/or by supporting the plant with substitute structure(s).

What is claimed is:

1. A method of feeding a leafy vegetable plant through its foliage comprising:
   applying a foliar feed formulation to a leaf of said leafy vegetable plant, wherein
   (a) the roots of the plant are in contact with an incomplete water solution or inert medium that is essentially free of the plant's nutritionally required mineral nutrients; and
   (b) the foliar feed formulation comprises a substantially full complement of the plant's nutritionally required mineral nutrients, and an effective amount of a penetrant;

wherein the substantially full complement of the plant's nutritionally required mineral nutrients is absorbed through the foliage of the plant and not through the roots of the plant.

2. The method of claim 1, wherein the roots of the plant are in contact with an incomplete water solution that is essentially free of the plant's nutritionally required mineral nutrients.

3. The method of claim 1, wherein the roots of the plant are in contact with an inert medium that is essentially free of the plant's nutritionally required mineral nutrients.

4. The method of claim 1, wherein the substantially full complement of the plant's nutritionally required mineral nutrients in the foliar feed formulation comprises a nitrogen source, a phosphorus source, a potassium source, a calcium source, a magnesium source, a sulfur source, a zinc source, a copper source, an iron source, a manganese source, a boron source, a molybdenum source, a chlorine source, and a nickel source.

5. The method of claim 1, wherein the penetrant is a biocompatible polar aprotic solvent.

6. The method of claim 5, wherein the biocompatible polar aprotic solvent is dimethyl sulfoxide (DMSO).

7. The method of claim 1, wherein the penetrant is a biocompatible anionic detergent.

8. A method of feeding a leafy vegetable plant through its foliage comprising:
applying a foliar feed formulation to a leaf of said leafy vegetable plant, wherein
(a) the roots of the plant are in contact with an incomplete water solution or inert medium that is essentially free of the plant's nutritionally required mineral nutrients; and
(b) the foliar feed formulation comprises (i) a substantially full complement of the plant's nutritionally required mineral nutrients, (ii) an effective amount of a penetrant, and (iii) a nutritionally-effective amount of citrulline or a citrulline-containing extract as a nitrogen source;
wherein the substantially full complement of the plant's nutritionally required mineral nutrients is absorbed through the foliage of the plant and not through the roots of the plant.

9. The method of claim 8, wherein the roots of the plant are in contact with an incomplete water solution that is essentially free of the plant's nutritionally required mineral nutrients.

10. The method of claim 8, wherein the roots of the plant are in contact with an inert medium that is essentially free of the plant's nutritionally required mineral nutrients.

11. The method of claim 8, wherein the substantially full complement of the plant's nutritionally required mineral nutrients in the foliar feed formulation comprises a nitrogen source, a phosphorus source, a potassium source, a calcium source, a magnesium source, a sulfur source, a zinc source, a copper source, an iron source, a manganese source, a boron source, a molybdenum source, a chlorine source, and a nickel source.

12. The method of claim 8, wherein the penetrant is a biocompatible polar aprotic solvent.

13. The method of claim 12, wherein the biocompatible polar aprotic solvent is DMSO.

14. The method of claim 8, wherein the penetrant is a biocompatible anionic detergent.

15. The method of claim 1, wherein the method is carried out without monitoring or replenishing nutritional requirements in the incomplete water solution or inert medium.

16. The method of claim 8, wherein the method is carried out without monitoring or replenishing nutritional requirements in the incomplete water solution or inert medium.

* * * * *